United States Patent [19]
Noda et al.

[11] Patent Number: 5,777,749
[45] Date of Patent: Jul. 7, 1998

[54] METHOD AND DEVICE FOR COMPRESSING BIT-MAP DATA

[75] Inventors: Tsugio Noda; Kenichiro Sakai, both of Kawasaki, Japan

[73] Assignee: Fujitsu Limited, Kanagawa, Japan

[21] Appl. No.: 802,096

[22] Filed: Feb. 19, 1997

Related U.S. Application Data

[63] Continuation of Ser. No. 423,634, Apr. 17, 1995, abandoned.

[30] Foreign Application Priority Data

Aug. 3, 1994 [JP] Japan .................. 6-182643

[51] Int. Cl.$^6$ .................. H04N 4/415
[52] U.S. Cl. .................. 358/261.3; 358/426; 358/433; 358/474; 358/261.1; 382/245; 382/246
[58] Field of Search .................. 358/448, 426, 358/261.1, 261.3, 261.2, 432, 433, 447, 474, 529; 382/232, 245, 246, 239, 318; 364/715.02, 715.03, 715.09, 715.11; H04N 4/415

[56] References Cited

U.S. PATENT DOCUMENTS

| | | | |
|---|---|---|---|
| 4,149,145 | 4/1979 | Hartke et al. | 358/432 |
| 4,603,607 | 8/1986 | Adachi | 358/261.3 |
| 4,870,498 | 9/1989 | Schoon | 358/261.1 |
| 4,896,275 | 1/1990 | Jackson | 364/519 |
| 4,982,293 | 1/1991 | Ishii | 358/429 |
| 5,276,526 | 1/1994 | Ishikawa | 358/261.3 |
| 5,335,290 | 8/1994 | Cullen et al. | 382/9 |

FOREIGN PATENT DOCUMENTS

| | | |
|---|---|---|
| 59-178077 | 10/1984 | Japan . |
| 61-107876 | 5/1986 | Japan . |
| 61-107877 | 5/1986 | Japan . |
| 62-55772 | 3/1987 | Japan . |
| 2-32675 | 2/1990 | Japan . |

Primary Examiner—Kim Yen Vu
Assistant Examiner—Madeleine A. V. Nguyen
Attorney, Agent, or Firm—Armstrong, Westerman, Hattori, McLeland & Naughton

[57] ABSTRACT

The present invention relates to a bit-map compressing method and a bit-map compressing device. The bit-map data compressing method includes a main scanning step for scanning bit-map data in a main scanning direction; a first region separating step for separating a region including black pixels and a region including no black pixels in line unit; a secondary scanning step for scanning in a secondary direction perpendicular to the main scanning direction; a second region separating step for separating a region including black pixels and a region including no black pixels, in column unit; and an encoding step for encoding as an element each region obtained in the first region separating step and the second region separating step. Bit-map can be transferred by effectively performing data compression on simple algorithm, without using special hardware.

34 Claims, 17 Drawing Sheets

FIG. 14

| DOCUMENT NO. | PRINTING REGION | NON-PRINTING REGION | | | | WHITE TO BLACK DOT RATIO | |
|---|---|---|---|---|---|---|---|
| | CHARACTER REGION | SPACE BETWEEN REGIONS | LOGICAL LINE FRONT/BACK SPACE | | EMPTY LINE | WHITE DOT | BLACK DOT |
| 1 | 5.9 | 8.4 | 30.3 | | 55.4 | 96.4 | 3.6 |
| 2 | 5.9 | 8.4 | 43.9 | | 42.1 | 96.1 | 3.9 |
| 3 | 5.8 | 7.7 | 36.3 | | 50.3 | 96.2 | 3.8 |
| 4 | 7.6 | 12.5 | 29.0 | | 50.9 | 95.6 | 4.4 |
| 5 | 6.8 | 11.1 | 31.6 | | 50.5 | 96.1 | 3.9 |
| 6 | 7.9 | 12.2 | 33.9 | | 46.0 | 95.6 | 4.4 |
| 7 | 6.2 | 9.8 | 28.8 | | 55.2 | 96.4 | 3.6 |
| 8 | 6.3 | 9.4 | 27.7 | | 56.6 | 96.3 | 3.7 |
| 9 | 7.6 | 11.6 | 31.7 | | 49.0 | 95.5 | 4.5 |
| 10 | 7.4 | 12.0 | 32.0 | | 48.6 | 95.7 | 4.3 |
| AVERAGE | 6.7 | 10.3 | 32.5 | | 50.4 | 96.0 | 4.0 |

UNIT %
WHITE DOT: NON-PRINTING/
BLACK DOT: PRINTING

FIG.15

| | CONTROL | CODE | FUNCTION | OPTION |
|---|---|---|---|---|
| A | END LINE | 001:00000 | SCAN-ENDING | NO |
| B | VERTICAL SPACE | 010:XXXXX | VERTICAL SKIPPING | NUMBER OF SKIPPED LINES |
| C | START BLOCK | 011:00000 | DESIGNATING START OF LOGICAL LINE | NO |
| D | END BLOCK | 100:XXXXX | DESIGNATING END OF LOGICAL LINE | COUNT VALUE OF PROCESSED LOGICAL LINE mod 32 |
| E | PUT BLOCK | 101:00000 | DESIGNATING START OF CHARACTER REGION | NO |
| F | SKIP BLOCK | 110:XXXXX | SKIPPING HORIZONTALLY INSIDE LOGICAL LINE | NUMBER OF SKIPPED DOTS |
| G | START SPACE | 000:00000 | DESIGNATING START OF SPACE BEHIND CHARACTER REGION | NO |
| H | REPEAT DATA | 111:XXXXX | REPETITIVE DATA COMPRESSION | REPETITIVE TIMES AND REPETITIVE OUTPUT DATA |

3-BIT CODE IN CONTROL: 5-BIT CODE IN OPTION

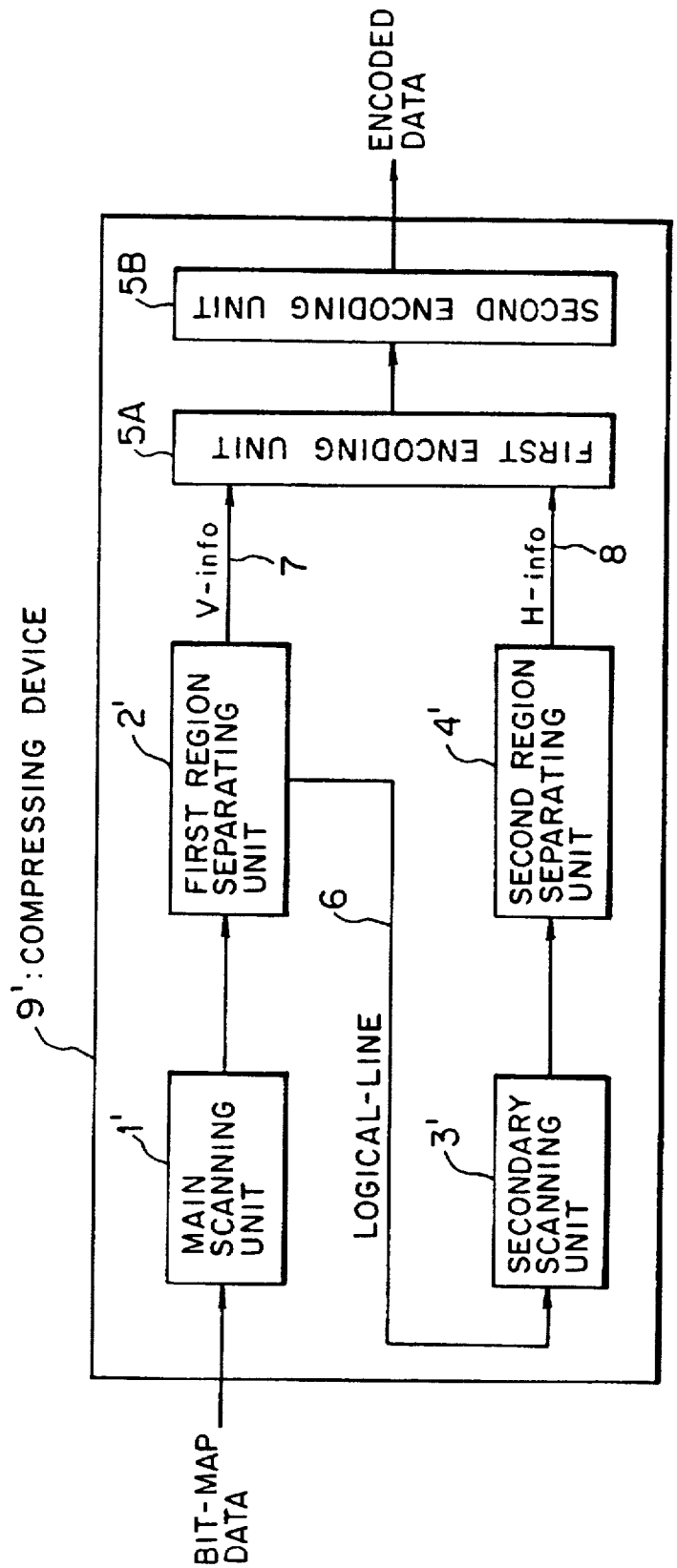

METHOD AND DEVICE FOR COMPRESSING BIT-MAP DATA

This application is a continuation of application Ser. No. 08/423,634 filed Apr. 17, 1995, now abandoned.

BACKGROUND OF THE INVENTION

1) Field of the Invention

The present invention relates to a method and device each compressing effectively bit-map data at high data transfer speed where bit-map data with no character (font) data is transferred directly to a printer to print characters.

2) Description of the Related Art

In printers (hereinafter referred to as image printers) with no font data used for personal computers, font data is expanded inside a personal computer to transfer bit-map data to a printer.

For that reason, in the image printer, the volume of transferable data can be increased, compared with the printer in which character information is transferred in code format. At the same time, the printing speed of the printer may be decreased.

In order to increase the amount of data transferred to a printer without decreasing the printing speed thereof, there are chiefly two methods: one that processing data transmission itself at high speed and the other that processing apparent data transmission at high speed.

The former method requires individual hardware and software, instead of Centronics being the standard interface between a personal computer and a printer. Hence the compatibility to other models is decreased. Furthermore, the inherent limitation of the hardware processing speed obstructs data transmission notably increased.

In recent years, the latter method has been aggressively studied to increase apparently data transmission by a data compression.

As a bit-map data compressing method adopted for image printers, there is a method which extracts a print region in a scan unit. This extracting method relates to a method of compressing data in a graphic mode by means of a font data built-in printer, particularly to a method of once scanning (or sweeping) plural lines (e.g. 48 lines) collectively in a serial printer such as an ink-jet printer.

In other words, the scan line (scanning width) with 48 lines (dots) is scanned, as shown in FIG. 17. The left blank region and the right blank region are arranged to the character region 25 including black pixels in the 48 lines. The left region is encoded into a sign representing a blank region.

The left blank region is encoded into a sign representing a blank region. The right blank region is encoded into a sign representing the end of the character region. Only the bit-map data of the remaining character region is transferred to a printer.

Furthermore, there is the run-length method which utilizes the tendency that white pixels or black pixels appear somewhat repetitively.

According to the compression method, data compression is performed by allocating a variable length code (Huffinan code) to a white average run length, considering that the test image used to select the CCITT international standard system has a white average run length of 38 to 152 and a black average run length of 4 to 7.

In such an example that the compression method is applied to image printer, print data can be compressed to ½ to 1/10.

Moreover, there is the MR(MMR) system that encodes the position (a pixel of interest changing) of a changing pixel (a pixel changed from white to black or from black to white). This method is being used the current G3(G4) facsimile machines.

In the method of extracting a print region in scan unit, since only the bit-map data corresponding to the region other than the upper, lower, left, and right black regions of a page is transferred, the burden of a personal computer is light. However, there is a disadvantage in that blanks between lines and between characters in a common text cannot be compressed because the transfer unit in the secondary scanning direction is many or 48 lines. The compression effect cannot be obtained so much in ruled documents such as tabulated data.

In the run-length system, the continuous length of the same data is counted and then allocated to a fixed length or variable length (Huffman code). Hence the configuration is simple and does not take excessive time in processing on the side of a personal computer. However, there is a disadvantage in that documents in Japanese including Chinese characters with many pixel changes cannot be sufficiently compressed because of utilization of only one-dimensional correlation.

The MR(MMR) system that encodes the relative position of two-dimensional changing point can provide high compression of line image data. However, referencing the memory many times requires exclusive hardware to apply the compression to image printers. Moreover, like the run-length system, considering the complexity of algorithm, an effective compression effect cannot be obtained to Chinese characters with many two-dimensional changing points.

Furthermore, in either system described above, a complicated algorithm for data compression leads adversely to a longer compression time in a personal computer.

SUMMARY OF THE INVENTION

The present invention is made to overcome the above mentioned problems. An object of the present invention is to provide a bit-map data compressing method that can transfer bit-map data without using special hardware and can effectively compress data, e.g. even documents in Japanese including Chinese characters having many two-dimensional strokes, according to a simple algorithm.

Another object of the present invention is to provide a bit-map data compressing device that can transfer bit-map data without using special hardware and can effectively compress data, e.g. even documents in Japanese including Chinese characters having many two-dimensional strokes, according to a simple algorithm.

In order to achieve the above objects, according to the present invention, the bit-map data compressing method, is characterized by a main scanning step for scanning bit-map data in a main scanning direction; a first region separating step for separating a region including black pixels and a region including no black pixels every K (an integer of 1 or more) lines, by performing the main scanning process; a secondary scanning step for scanning a logical line in a secondary direction perpendicular to the main scanning direction, the logical line where at least one line obtained by the first region separating step is defined as N lines (an integer of 1 or more) including black pixels; a second region separating step for separating a region including black pixels in column unit and a region including no black pixels, by performing the secondary scanning step; and an encoding step for encoding as an element each of regions obtained by the first region separating step and the second region separating step.

According to the present invention, the bit-map data compressing method, is characterized by a main scanning step for scanning bit-map data in a main scanning direction; a first region separating step for separating a region including black pixels and a region including no black pixels every K (an integer of 1 or more) lines, by performing the main scanning process; a secondary scanning step for scanning a logical line in a secondary direction perpendicular to the main scanning direction, the logical line where at least one line obtained by the first region separating step is defined as N lines (an integer of 1 or more) including black pixels; a second region separating step for separating a region including black pixels in column unit and a region including no black pixels, by performing the secondary scanning step; a first encoding step for encoding as an element each region obtained in the first region separating step and the second region separating step; and a second encoding step for subjecting the first encoded data to a second encoding process, the first encoded data obtained by encoding regions as elements respectively obtained in the first region separating step and the second region separating step, in the first encoding step.

Therefore, there is an advantage in that since all blank regions including black pixels in bit-map data can be further compressed effectively, the bit-map data compression rate can be remarkably improved.

Moreover, according to the present invention, the bit-map data compressing device, is characterized by main scanning means for scanning bit-map data in a main scanning direction; first region separating means for separating a region including black pixels and a region including no black pixels every K (an integer of 1 or more) lines, based on data obtained by operating the main scanning means; secondary scanning means for scanning a logical line in a secondary direction perpendicular to the main scanning direction, the logical line where at least one line obtained by the first region separating means is defined as N lines (an integer of 1 or more) including black pixels; second region separating means for separating a region including black pixels in column unit and a region including no black pixels, based on data obtained by operating the secondary scanning means; and encoding means for encoding each region obtained by the first region separating means and the second region separating means into a code formed of a control classification and an argument each prescribed previously.

According to the present invention, the bit-map data compressing device, is characterized by main scanning means for scanning bit-map data in a main scanning direction; first region separating means for separating a region including black pixels and a region including no black pixels every K (an integer of 1 or more) lines, based on data obtained by operating the main scanning means; secondary scanning means for scanning a logical line in a secondary direction perpendicular to the main scanning direction, the logical line where at least one line obtained by the first region separating means is defined as N lines (an integer of 1 or more) including black pixels; second region separating means for separating a region including black pixels in column unit and a region including no black pixels, based on data obtained by operating the secondary scanning means; first encoding means for encoding each region obtained by the first region separating means and the second region separating means into a code formed of a control classification and an argument each described previously; and second encoding means for encoding the first encoded data obtained by the first encoding means into sign data with a variable length.

As described above, there is an advantage in that the volume of bit-map data can be reduced by effectively representing the blank regions in all regions of bit-map data, whereby the performance of the bit-map data compressing device can be largely improved.

BRIEF DESCRIPTION OF THE DRAWINGS

FIG. 14 is a diagram showing an example of the blank to character region ratio of a bit-map according the first embodiment of the present invention;

FIG. 15 is a diagram showing a list of control codes according to the first embodiment of the present invention;

FIG. 16 is a block diagram showing the configuration of a device embodying the bit-map data compressing method according to the second embodiment of the present invention.

DESCRIPTION OF THE PREFERRED EMBODIMENTS (a) Aspect of the Present Invention

First, the aspect of the present invention will be described below with reference to the attached drawings.

Figure 1:
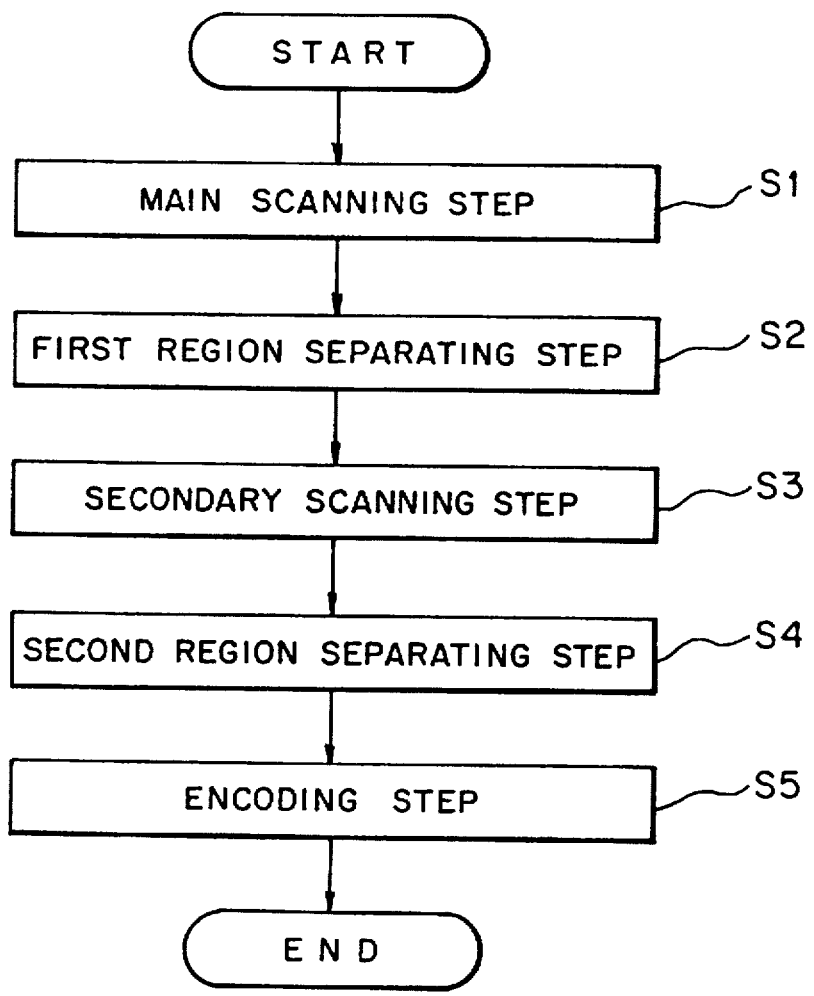
FIG. 1 is a diagram used for explaining an aspect of the present invention.

FIG. 1 is a diagram used for explaining an aspect of the present invention. Referring to FIG. 1, the bit-map data compressing method includes a main scanning step for scanning bit-map data in a main scanning direction (step S1) and a first region separating step (step S2) for separating a region including black pixels and a region not including black pixels every K (an integer of 1 or more) lines, by performing the main scanning process (step S1).

The bit-map data compressing method also includes a secondary scanning step (step S3) for scanning a logical line in a secondary direction perpendicular to the main scanning direction, the logical line where at least one line obtained by the first region separating step (step S2) is defined as N lines (an integer of 1 or more) including black pixels, and a second region separating step (step S4) for separating a region including black pixels in column unit and a region not including black pixels, by performing the secondary scanning step (step S3).

Moreover, the bit-map data compressing method includes an encoding step (step S5) for encoding as an element each region obtained in the first region separating step (step S2) and the second region separating step (step S4).

According to the bit-map data compressing method of the present invention, bit-map data is scanned in the main scanning direction in the main scanning step (step S1) and then separated into regions including black pixels and region not including black pixels every K (an integer of 1 or more) lines.

In the secondary scanning step (step S3), at least one line obtained in the first region separating step (step S2) is among logical lines defined as the N (an integer of 1 or more) linen including black pixels and is scanned in the secondary scanning direction perpendicularly to the main scanning direction. In the encoding step (step S5), the regions obtained in the first region separating step (step S2) and the second region separating step (step S4) can be encoded as elements.

Hence, all blank regions with no black pixels in the bit-map data can be effectively compressed so that the bit-map data compression rate can be improved remarkably.

Figure 2:
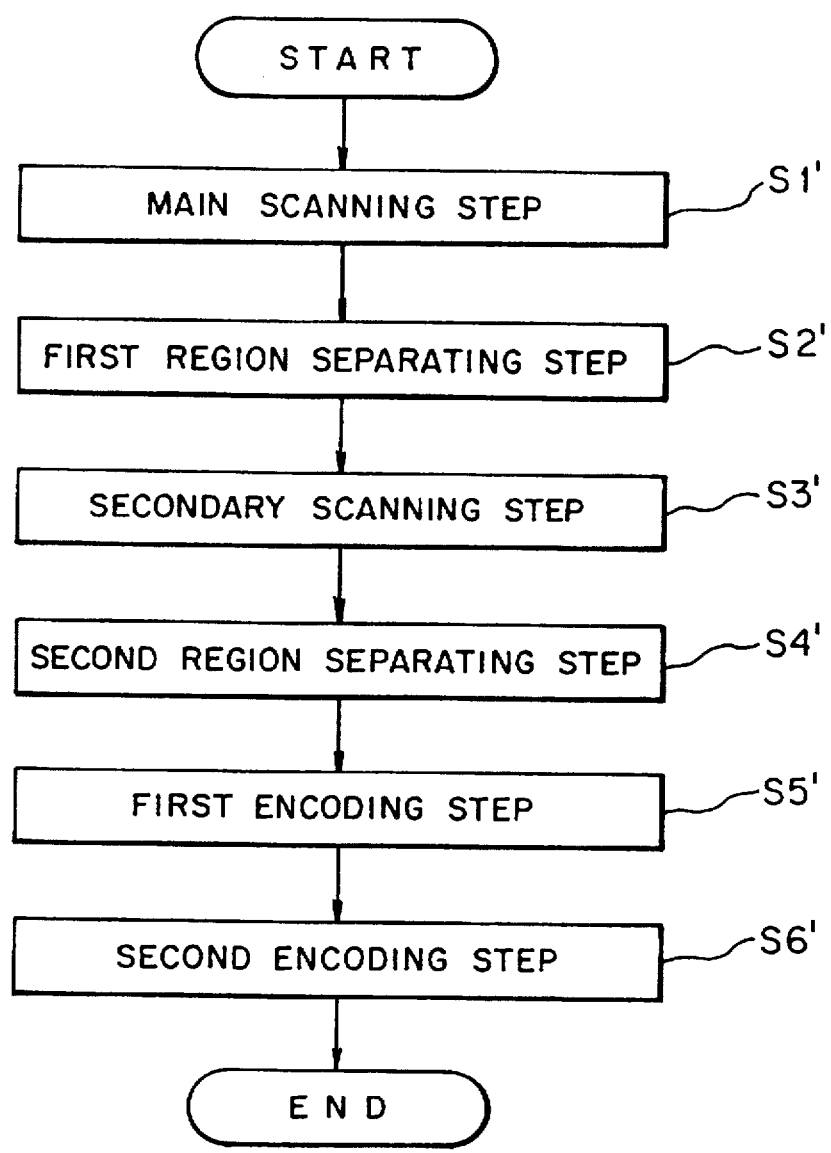
FIG. 2 is a diagram used for explaining an aspect of the present invention.

FIG. 2 shows an explanatory diagram of the aspect of the present invention. As shown in FIG. 2, the bit-map data compressing method includes a main scanning step for scanning bit-map data in a main scanning direction (step S1') and a first region separating step (step S2') for separating a region including black pixels and a region not including black pixels every K (an integer of 1 or more) lines, by performing the main scanning process (step S1').

The bit-map data compressing method also includes a secondary scanning step (step S3') for scanning a logical line in a secondary direction perpendicular to the main scanning direction, the logical line where at least one line obtained in the first region separating step (step S2')is defined as N line(s) (an integer of 1 or more) including black pixels, and a second region separating step (step S4') for separating a region including black pixels in column unit and a region not including black pixels, by performing the secondary scanning step (step S3').

Next, a first encoding step (step S5') encodes as an element each region obtained in the first region separating step (step S2') and the second region separating step (step S4'). A second, encoding step (step S6') subjects the first encoded data encoded in the first encoding step (step S5') to the second encoding process.

In the bit-map data compressing method of the present invention, bit-map data is scanned in the main scanning direction in the main scanning step (step S1') and then separated into regions including black pixels and regions not including black pixels every K (an integer of 1 or more) lines in the first region separating step (step S2').

In the secondary scanning step (step S3'), at least one line obtained in the first region separating step (step S2') is among logical lines defined as the N (an integer of 1 or more) line(s) including black pixels and is scanned in the secondary scanning direction perpendicular to the main scanning direction.

In the first encoding step (step S5'), the regions obtained in the first region separating step (step S2') and the second region separating step (step S4') can be encoded as elements. In the second encoding step (step S6'), an encoding process is subjected to the encoded data encoded in the first encoding step (step S5').

Hence, all blank regions with no black pixels in the bit-map data can be effectively compressed so that the bit-map data compression rate can be improved remarkably.

In the bit-map data compressing method of the present invention, a region formed of successive M lines (M≧R) can be encoded as one region, the region including no black pixels obtained in the first region separating step (steps S2 or S2').

A region including no black pixels in the lead or the end of each page, obtained in the first region separating step (steps S2 or S2'), can be encoded as one region.

In this case, a region formed of successive M (M≧K) lines including no black pixels and obtained in the first region separating step (step S2 or S2') can be encoded as one region. Even if a region including no black pixels and obtained in the first region separating step (step S2 or S2') is the head on each page, it can be encoded as one region. Likewise, where the region is the end of each page, it can be encoded as one region.

Hence, the blank regions arranged at the page heads or bottoms of a bit-map of a document can be collectively and effectively encoded. Thus the compression rate of bit-map data can be improved largely.

According to the bit-map data compressing method of the invention, a region including no black pixels in the logical line, obtained by the second region separating step (step S4 or S4'), can be encoded as one region. A region including no black pixels at the left or right end of each logical line, obtained by the second region separating step (step S4 or S4'), can be encoded as one region.

Thus the region including no black pixels in each logical line, obtained in the second region separating step (step S4 or S4'), can be encoded as one region. Where the region including no black pixels, obtained in the second region separating step (step S4 or S4'), is on the left end in each logical line, it can be encoded as one region. Likewise, where the region is on the right end of each logical line, it can be encoded as one region.

Therefore, in the bit-map corresponding to a document, the indented blank region on the right end, the blank region on the left end due to a short sentence, or blank region between characters can be effectively compressed so that the bit-map data compression rate can be largely improved.

The number of logical lines created in the first region separating step (step S2 or S2') is a fixed value N, e.g. 8.

Thus the logical lines created in the first region separating step (step S2 or S2') can be set to a fixed value N, e.g. 8.

In a compression of the bit-map data such as a document, the blank regions therein, for example, can be effectively compressed. Moreover, since the processing unit of the processor in a personal computer can be agreed with the bit width of the memory, the personal computer and the printer can be largely released from the processing burden.

In the bit-map data compressing method of the present invention, the end sign of a character region may be 0, the character region defined as a region including continuous black pixels in a logical line, obtained in the second region separating step (S4 or S4').

Thus the end code of the character region, which includes successive black pixels in a logical line, obtained in the second region separating step (step S4 or S4'), is 0.

Eliminating manifestation of the successive width of a character region in a bit-map data releases the load of the bit-map data compressing process, thus largely improving the compression rate.

The regions obtained in the first region separating step (step S2 or S2') and the second region separating step (step S4 or S4') are identified with 8-bit code. The region identifying 8-bit code can be formed of a control classification and an argument.

In this case, the regions obtained in the first region separating step (step S2 or S2') and the second region separating step (step S4 or S4') can be identified with 8-bit code.

The regions can be identified with the 8-bit length code formed of a control classification and an argument.

Thus the bit-map data compressing process can be easily controlled. The personal computers and printers can be largely released from the load for the bit-map data compressing process.

At least one of 8-bit arguments can accompany immediately behind all or part of 8-bit code identifying regions each formed of a control classification and an argument.

Thus, even if the regions obtained in the first region separating step and the second region separating step are large, they can be identified effectively. Compressing all the bit-map data in byte unit improves the repetitive rate of the compressed patterns.

In the bit-map data compressing method according to the present invention, a code representing repetition can be allocated to data appearing continuously twice or more in bit-map data in a character region including successive black pixels in the logical line, obtained in the second region separating step (step S4 or S4'), the data formed of a control classification and the number of repetitive cycles.

Thus a code representing the number of repetition can be allocated to data appearing continuously twice or more in bit-map data in a character region including black pixels in the logical line, obtained in the second region separating step (step S4 or S4'), the data being formed of a control classification and the number of repetitive cycles. Hence data appearing continuously can be easily compressed so that the personal computers and printers can be largely released from the burden for processing.

In the bit-map data compressing method according to the present invention, a code representing information regarding a position counted from the head of a page is added immediately after the final character region in the logical line obtained in the second region separating step (step S4 or S4').

Even if a bit error occurs during a bit-map data transmission, the error can be prevented from propagating from the position information of the page head to the data following the error bit-map data. As a result, the bit map data succeeding from the error occurrence point can be prevented from being shifted.

Moreover, the start position of the first character region in a logical line can be encoded as a relative value to the start position of the first character region of the logical line immediately ahead the above-mentioned logical line. For example, where the bit-map data of a document in which the start position of the first character region in a logical line is indented to or near to the start position of the first character region in the logical line immediately ahead the former logical line, the bit-map data compression rate can be further increased.

Figure 3:
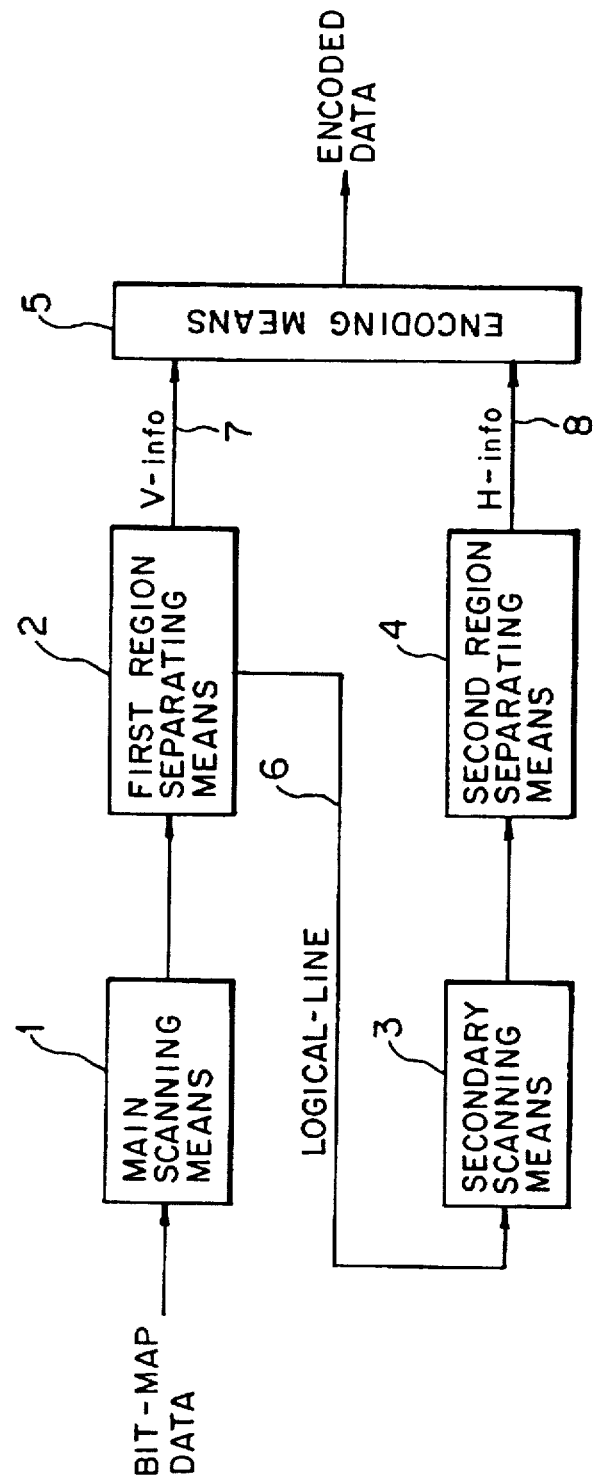
FIG. 3 is a block diagram showing an aspect of the present invention.

FIG. 3 is a block diagram showing the aspect of the present invention. FIG. 3 shows the bit-map data compressing device to execute the steps (steps S1 to S5) described with FIG. 1, according to the present invention.

Referring to FIG. 3, numeral 1 represents a main scanning means, 2 represents first region separating means, 3 represents secondary scanning means, 4 represents second region separating means, and 5 represents encoding means.

The main scanning means 1 scans bit-map data in the main scanning direction. The first region separating means 2 separates the bit-map data scanned by the main scanning means 1 into regions including black pixels and regions including no black pixels every K lines.

The secondary scanning means 3 scans the logical line obtained in the first region separating means 2 and defined as N lines including at least one line with black pixels in the direction perpendicular to the secondary scanning direction. The second region separating means 4 separates the logical line obtained by means of the secondary scanning means 3 into regions including black pixels and regions including no black pixels every one column.

The encoding means 5 encodes regions obtained in the first region separating means 2 and the second region separating means 3 into a code formed of a control classification and an argument each predetermined.

In FIG. 3, the line 6 connects the first region separating means 2 to the secondary scanning means 3 to transfer bit-map data for a logical line. The line 7 transfers information (V-info) regarding the region obtained by means of the first region separating means 2. The line 8 transfers information (H-info) regarding regions obtained by means of the second region separating means 4.

In the bit-map data compressing device, the main scanning means 1 scans bit-map data in the main scanning direction. The first region separating means 2 separates the bit-map data into the regions including black pixels and regions including no black pixels every K (an integer of 1 or more) lines, based on the resultant data.

The secondary scanning means 3 scans a logical line in the secondary scanning direction perpendicular to the main scanning direction, the logical line being defined as N (an integer of 1 or more) lines including at least one line with black pixels, obtained by the first region separating means. Then the second region separating means 4 separates the logical line into the regions including black pixels and regions including no black pixels every one column, based on data obtained by the secondary scanning means 3.

The regions obtained by the first region separating means 2 and the second region separating means 4 are encoded into a code formed of a control classification and an argument each predetermined.

As described above, according to the bit-map data compressing device, black regions in all the regions in bit-map data can be effectively expressed so that the volume of the bit-map data can be reduced. Thus the performance of the bit-map data compressing device can be improved more.

Figure 4:
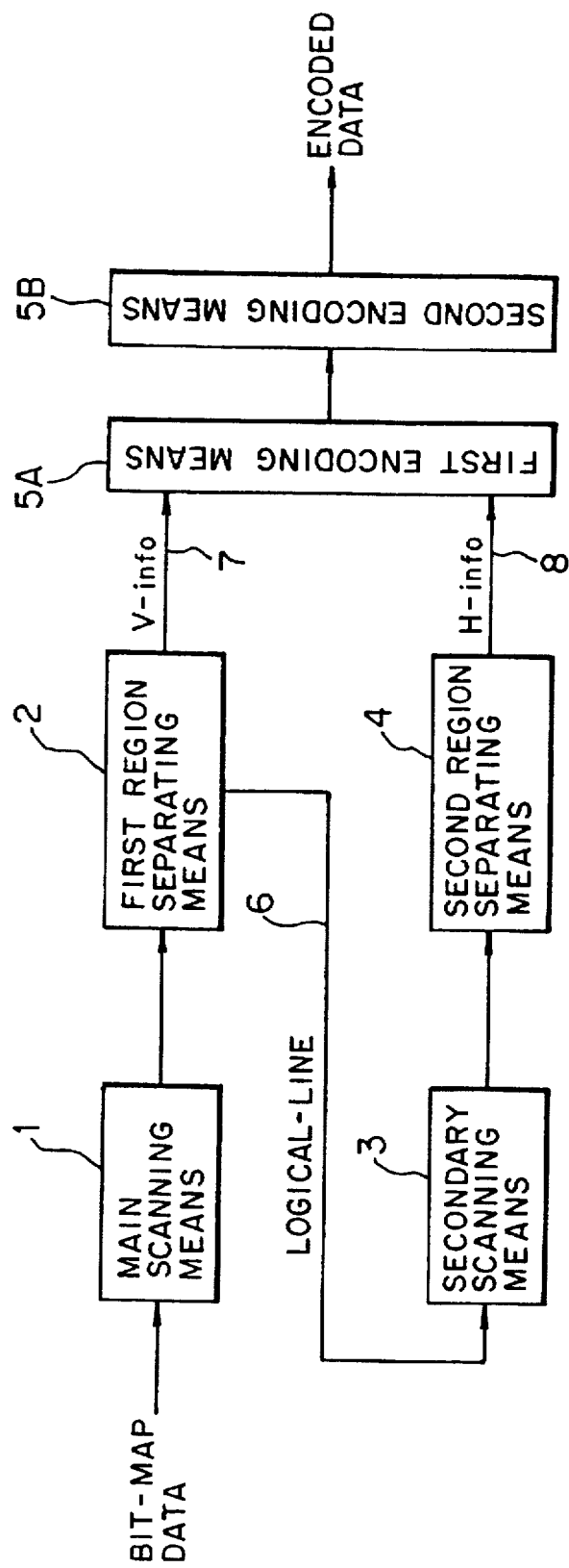
FIG. 4 is a block diagram showing an aspect of the present invention.

FIG. 4 is a block diagram showing the aspect of the present invention. FIG. 4 shows the configuration of the bit-map data compressing device to operate the steps (steps S'1 to S'6) described with reference to FIG. 2.

Referring to FIG. 4, numeral 1 represents main scanning means, 2 represents first region separating means, 3 represents secondary scanning means, 4 represents second region separating means, 5A represents first encoding means, and 5B represents second encoding means.

In this case, the main scanning means 1 scans bit-map data in the main scanning direction. The first region separating means 2 separates the bit-map data scanned by the main scanning means 1 into regions including black pixels and regions including no black pixels every K line.

The secondary scanning means 3 scans the logical line defined as N lines including at least one line with black pixels, obtained by the first region separating means 2, in the direction perpendicular to the main scanning direction. Then the second region separating means 4 separates the logical line scanned by the secondary scanning means 3 into the regions including black pixels and regions including no black pixels every one column.

Furthermore, the first encoding means 5A encodes regions obtained in the first region separating means 2 and the second region separating means 4 into a control classification and an argument each predetermined. The second encoding means 5B encodes the first encoded data obtained in the first encoding means 5A into a variable length code.

In FIG. 4, the lines 6, 7, and 8 represent to those in FIG. 3, respectively. The detail description will be omitted here.

Like the embodiment shown in FIG. 3, in the bit-map data compressing device, the main scanning means 1 scans bit-map data in the main scanning direction and the first region separating means 2 separates data obtained by the main scanning means into regions including black pixels and regions including no black pixels every K (an integer of 1 or more) line.

The secondary scanning means 3 scans the logical line defined as N (an integer of 1 or more) line(s) including at least one line with black pixels, obtained by the first region separating means, in the secondary scanning direction perpendicular to the main scanning direction. Then the second region separating means 4 separates the logical line obtained by the secondary scanning means 3 into the regions including black pixels and regions including no black pixels every one column.

Furthermore, the first encoding means 5A encodes regions obtained in the first region separating means 2 and the second region separating means 4 into a control classification and an argument each predetermined. The second encoding means 5B encodes the first encoded data obtained in the first encoding means 5A into a code with variable length.

In other words, the volume of data can be reduced by expressing effectively the blank regions of all the regions in bit-map data. Then data is encoded into coded data with variable length. The volume of the bit-map data can be further reduced. Thus the performance of the bit-map data compressing device can be largely improved.

(b) Explanation of the First Embodiment of the Present Invention

Explanation will be made below as for the first embodiment according to the present invention, with reference to the attached drawings.

Figure 5:
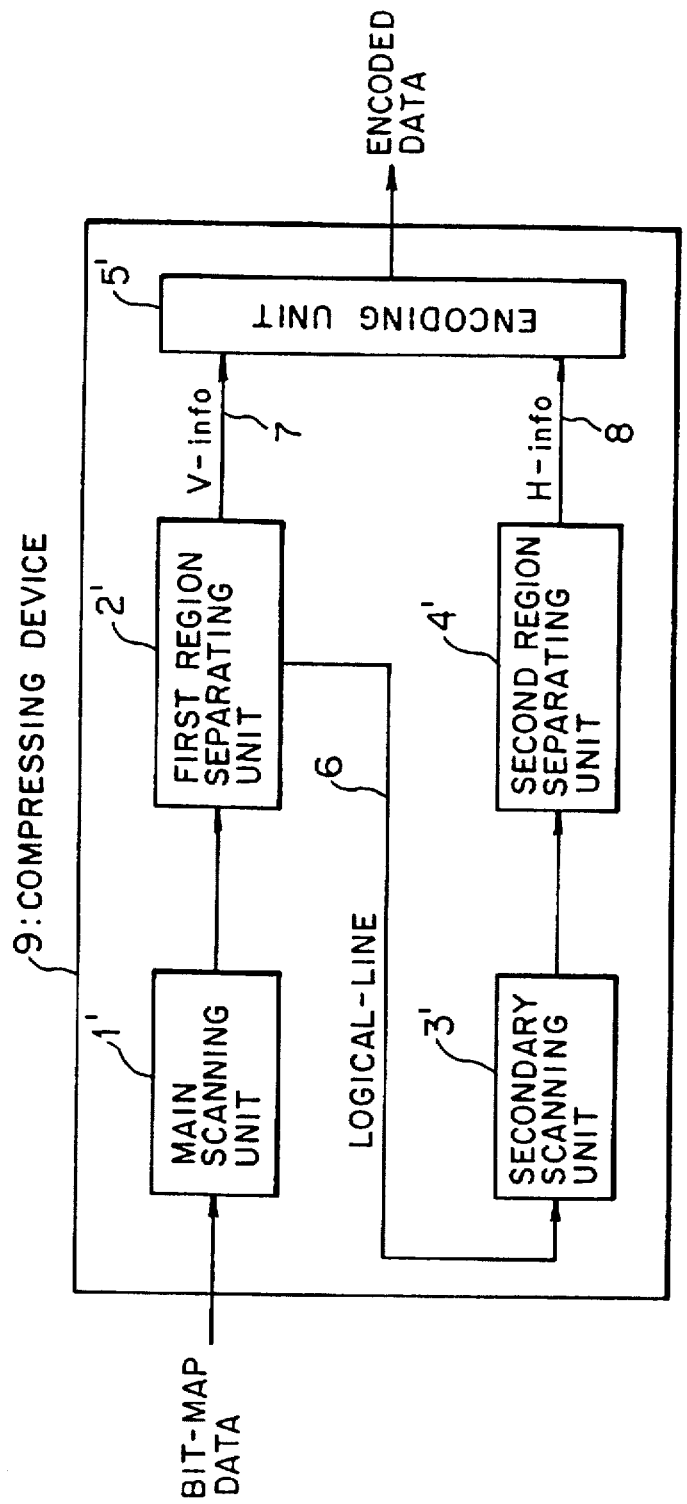
FIG. 5 is a block diagram showing a device embodying the bit-map compressing method according to the first embodiment of the present invention.

FIG. 5 is a block diagram illustrating the configuration of a device embodying the bit-map data compressing method according to the first embodiment of the present invention. Referring to FIG. 5, the compressing device 9 includes a main scanning unit 1' acting as main scanning means, a first region separating unit 2' acting as first region separating means, a secondary scanning unit 3' acting as secondary scanning means, a second region separating unit 4' acting as second region separating means, and an encoding unit 5' acting as encoding means.

Figures 11A, 11B:
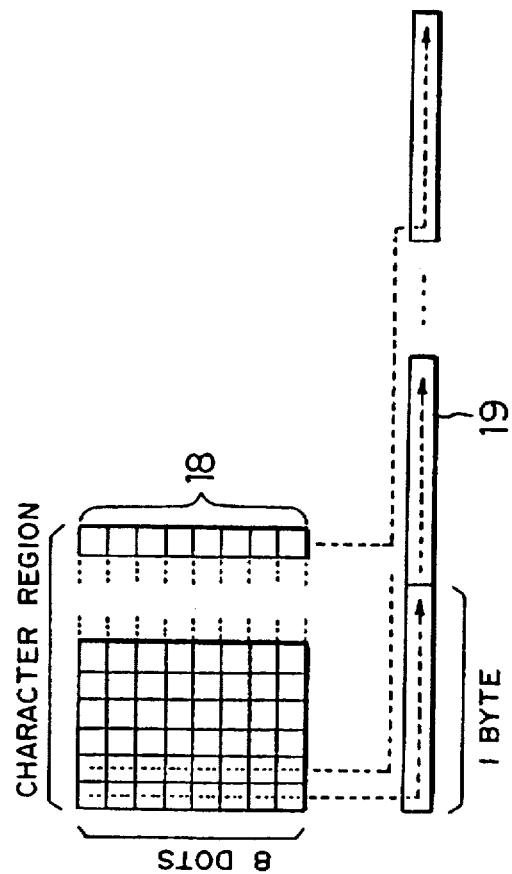
FIG. 11(a) is a diagram showing the bit-map data scanning unit and the bit-map data scanning direction according to the first embodiment of the present invention.
FIG. 11(b) is a diagram showing the bit-map data scanning unit and the bit-map data scanning direction according to the first embodiment of the present invention.

The main scanning unit 1' scans bit-map data such as documents in the main scanning direction 19 (shown in FIG. 11(b)) every 8 line (dot) unit shown with numeral 18 in FIG. 11(a).

The first region separating unit 2' separates the 8-line unit region obtained through the 8-line unit scanning process into regions including characters (black pixels) and regions including no characters.

The secondary scanning unit 3' scans a logical line defined as at least one line with characters every one column (byte) unit, in the secondary scanning direction perpendicular to the main scanning direction.

The second region separating unit 4' separates one column unit scanned by means of the secondary scanning unit 3' into regions including characters and regions including no characters.

The encoding unit 5' encodes each of regions obtained in the first region separating unit 2' and the second region separating unit 4' into a 8-bit length code "XXX:xxxxx" formed of 3 bits "XXX" representing a control classification and 5 bits "xxxxx" representing an argument. Each is usually represented in a binary number, the "X" and "x" are numeral "0" or "1".

Like the embodiment shown in FIG. 3, FIG. 5 shows a line 6 which connects the first region separating unit 2' to the secondary scanning unit 3' to transfer bit-map data of a logical line, a line 7 which transfers information (V-info) regarding a region obtained by the first region separating unit 2', and the line 8 which transfers information (H-info) regarding a region obtained by the second region separating unit 4'.

Figure 6:
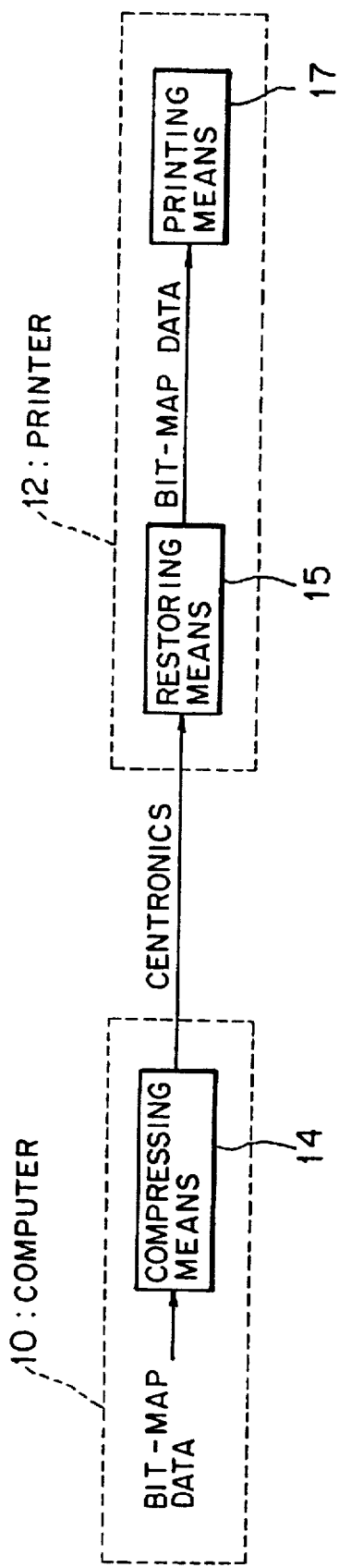
FIG. 6 is a block diagram illustrating the entire configuration of the bit-map compressing device.

FIG. 6 is a diagram illustrating the entire configuration of a device that transfers data from a computer 10 to a printer, according to the bit-map data compressing method. As shown in FIG. 6, the computer 10 includes bit-map data compressing means 14. The printer 12 includes restoring means 15 that restores compressed bit-map data sent according to a Centronics interface and printing means 17 that prints the restored bit-map data.

In the above system, the printer 12 can print documents in Japanese or English on the computer 10. The bit-map data compressing device 9 shown in FIG. 5 performs the compressing method corresponding to the process performed in the compressing means 14 shown in FIG. 6.

Next, explanation will be made below in detail as for the case where the bit-map data compressing device 9 according to the first embodiment shown in FIG. 5 compresses the document in English (bit-map) shown in FIG. 12.

The document in English is written with characters in 12 point size, including a blank of 16 dots between lines (logical lines), a blank of 1 to 4 dots between characters, a blank of 12 to 20 dots between, and characters of 52 dots high.

Figure 12:
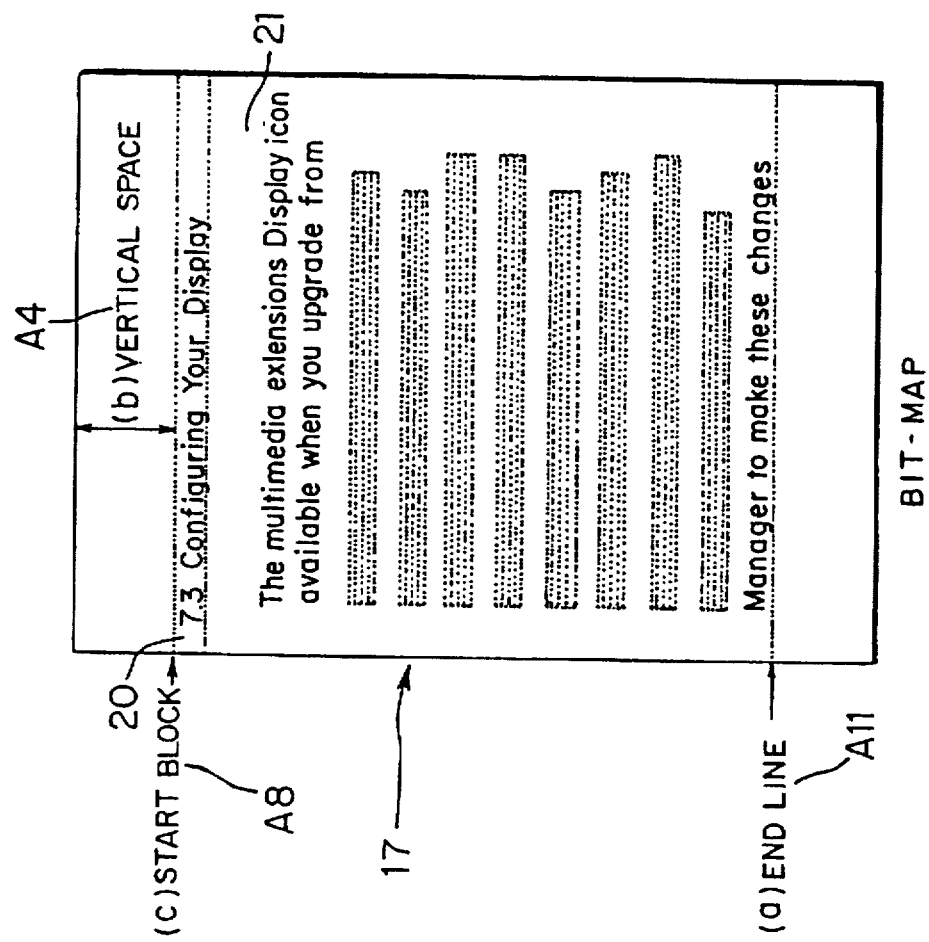
FIG. 12 is a diagram illustrating a document in English used for explaining the first embodiment of the present invention.
Figure 13:
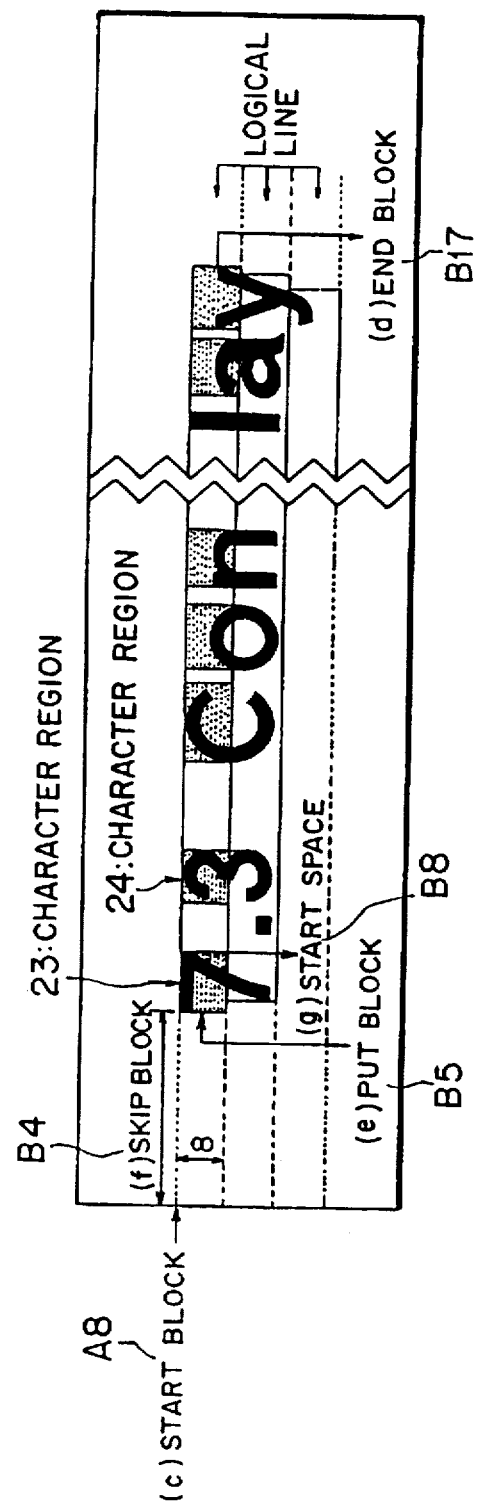
FIG. 13 is a diagram illustrating a document in English used for explaining the first embodiment of the present invention.
Figure 17:
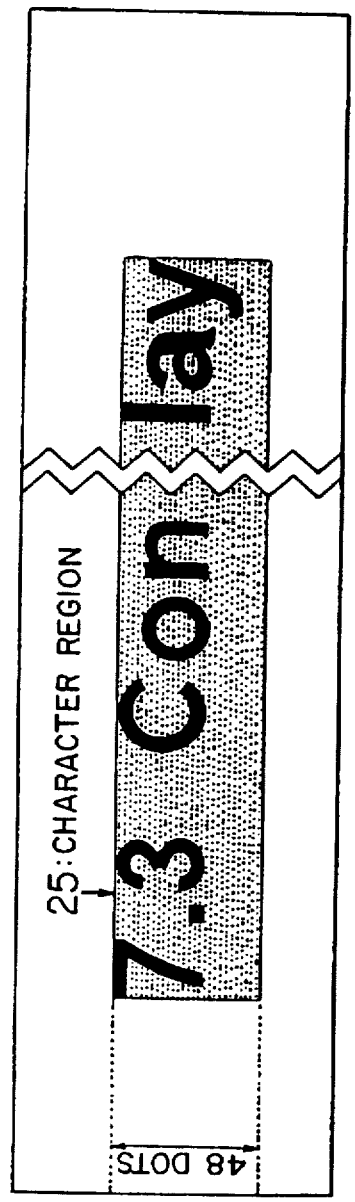
FIG. 17 is a diagram showing a bit-map data compressing method.

FIG. 13 is a diagram showing an enlargement of the region indicated with numeral 20 shown in FIG. 12.

First, the process that encodes (compresses) bit-map. data, using the main scanning unit 1', the first region separating unit 2', and the encoding unit 5' will be described below, with reference to the steps A1 to A11 shown in FIG. 7 and the document in English shown in FIG. 12. In FIG. 12, symbols 4, A8, and A11 correspond respectively to the steps shown in FIG. 7. Numeral 20 represents a line including characters.

The main scanning unit 1' scans the English document bit-map 17 from the top portion every logical line of 8-lines (dots), in the main scanning direction (step A1), and then detects whether black pixels are included in each logical line (step A2).

The main scanning unit 1' transfers the detection result to the first region separating unit 2'. After receiving the detection result, if the logical line received includes black pixels and is formed entirely of white pixels (blanks), the second region separating unit 2' returns its process to the step A1. Then the main scanning unit 1' repeats the 8-line scanning.

That is, the main scanning unit 1' repeats the 8-line scanning till the character including line 20 is found.

Where the detection result received by means of the first region separating unit 2' includes black pixels, YES route is selected in the step A2. The first region separating unit 2' extracts successive white pixels or blank regions (step A3) in the previous steps. The blank region is transferred as information (V-info) to the encoding unit 5'.

The encoding unit 5' receives the blank regions extracted in the first region separating unit 2' and encodes it into a VERTICAL SPACE code "010:xxxxx" representing a blank region (step A4).

In the VERTICAL SPACE code, "010" stands for a control classification representing skipping vertically on a page. "xxxxx" stands for a binary numeral of a run-length (length of continuous blank regions) by which a vertical skipping is performed at a time of printing a document.

The run-length of a black region having, for example, "17" is represented by five binary digits 10001 (or 0x11 represented by hexadecimal notation). The VERTICAL SPACE code representing control (VSKIP17) of skipping vertically by 17 run-length is "010:10001".

Five binary digits can represent decimal digits 1 to 31 (00001 to 11111 in binary notation). Hence the run-lengths 1 to 31 can be represented by a VERTICAL SPACE code of 1 byte (8 bits).

In the case of the run-length with 32 or more, the argument "xxxxx" of the 8-bit code is "00000". Where the special meaning that continuous arguments further following the 8-bit code exist and that the argument starts from "32" is given to the argument "00000", the control code can be represented by 2 byte notation "010:00000 xxxxxxxx" formed of a 8-bit code plus 8 bits.

The run-length can be represented from "32" to "287". The run-length "200" is represented by binary digits corresponding to "168".

That is, "168" is represented by binary digits "10101000" (or "a8" in hexadecimal notation). The VERTICAL SPACE code is "010:00000 10101000" representing a control (VSKIP200) by which the run-length is skipped vertically by 200. Similarly, the run-length of "288" or more is represented with 3-byte including the argument of 8-bit further added.

The VERTICAL SPACE code can be represented by plural bytes further including plural arguments behind the argument.

Next, the main scanning unit 1' subjects the English document bit-map 17 to the 8-line scanning (step A5) and detects whether black pixels includes in the logical line formed of 8 bits (step A6).

The main scanning unit 1' transmits the detection result to the first region separating unit 2'. After receiving the detection result, if black pixels are included in the logical line formed of 8 lines, the first region separating unit 2' selects YES route in the step A6, thus returning the process to the step A5.

The main scanning unit 1' performed again the 8-line scanning operation.

In other words, the main scanning unit 1' repeats the 8-line scanning till scanning the line 20 including acters is stopped and then the start of a new blank line 21 is detected.

As a result, the number of lines forming a logical line, obtained in the first region separating unit 2', is "8 (lines)".

Where the detection result received by the first region separating unit 2' does not include black pixels, NO route is selected in the step A6. The first region separating unit 2' extracts collectively places including successive black pixels, or logical lines including character regions, (step A7) and then transfers the logical line including character regions as information H-info.

In this case, the number of lines forming a logical line obtained in the first region separating unit 2' is a fixed value (N) being 8 (lines) or more.

The encoding unit 5' encodes the received logical line into the START BLOCK code "011:00000" formed of a control classification "011" designating the start of a logical line including character regions and "00000" representing no arguments (step A8).

The first region separating unit 2 transfers the logical line to the secondary scanning unit 3' via the line 6 (step A9) to encode blank regions included in the logical line and then detects whether the final line (final logical line, or the bottom on document page) follows (step A10).

If the detection result does not show the final line, the process goes to the step A1. Then the steps A1 to A9 are repeated till the main scanning unit 1' detects the final line.

If the detection result shows the final line, the line (logical line) is transferred as information H-info to the encoding unit 5'. The encoding unit 5' encodes the line into an END LINE code "001:00000" representing the final line (step A11).

As described above, the region formed 4e.g. 17 or 200) lines including no successive black pixels obtained in the first region separating unit 2' is encoded as a single region.

Moreover, the region including no black pixels at the head or end on each page is encoded as a single region.

In the steps A1 to A11, the document in English (bit-map data) is separated into lines each including black pixels in 8 line unit (logical line) and blank regions (the top and bottom of a document, and the space between lines) including no black pixels. The line including black pixels is transferred to the secondary scanning unit 3' and the blank region is encoded in the encoding unit 5'.

Figure 8:
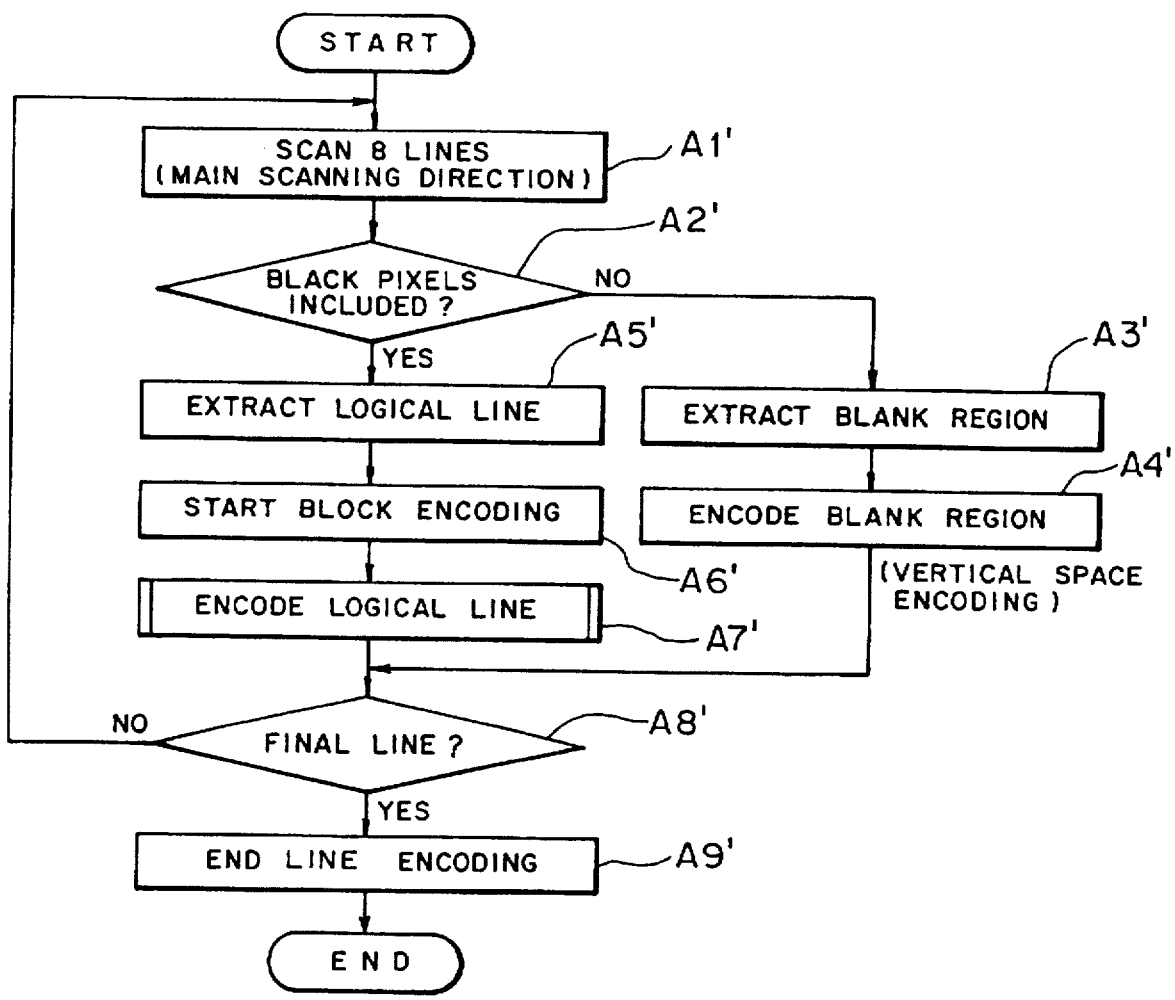
FIG. 8 is a flow chart used for explaining another operation of the first embodiment according to the present invention.

The above steps follows the steps A1' to A9' shown in FIG. 8. In this case, unlike the steps A3 and A4 shown in FIG. 8 in which blank regions of 8 lines or more are extracted and encoded at a time, blank regions are extracted and encoded in 8-line unit.

In other words, the main scanning unit 1' scans the document from the top in the main scanning direction and in 8-line unit (logical line) (step A1') and then detects whether black pixels are included in 8 lines (step A2').

Where 8 lines does not include any black pixels, the first region separating unit 2' extracts black regions for 8 lines (step A3') and the encoding unit 5' encodes it into a VERTICAL SPACE code "010:xxxxx" (step A4').

Where 8 lines includes black pixels, the first region separating unit 2' extracts a logical lines for 8 lines (step A5') and the encoding unit 5' encodes the start position of a logical line including character regions into a START BLOCK code "011:00000" (step A6').

At the same time, in order to separate and encode the logical line into character regions and black regions, the first region separating unit 2' transfers the logical line to the secondary scanning unit 3' via the line 6 (step A7') and then detects whether the final line (the bottom on document page) follows (step A8').

If the detection result is not the final line, the process goes to the step A1'. Then the steps A1' to A7' are repeated till the final line is detected.

If the detection result shows the final line, the encoding unit 5' encodes the line into an END LINE code "001:00000" representing the bottom of the document page (step A9').

As described above, according to the present embodiment, the main scanning unit 1' scans the line in 8-lines (dots) unit and the first region separating unit 2' extracts collectively blank regions in 8 lines or more as a single blank region.

Hence, the blank region arranged often at the top or bottom of a document can be effectively encoded and compressed to provide a document with good appearance.

Furthermore, the main scanning unit 1' scans a document including characters (characters with 52 dots in height on the document in English shown in FIG. 12) far smaller than the written characters in 8-line (dot) unit. Hence the blank region between lines can be effectively encoded and compressed, in addition to the black regions at the top and bottom of a document.

The main scanning unit 1' scans the line in 8-line unit.

The main scanning unit 1' also can scan the line in K (an integer or 1 or more) line unit.

Next, the secondary unit 3' scans a logical line including character regions or a line including no encoded characters in the process (steps A1 to A11), transferred from the first region separating unit 2' via the line 6 in the step A9. The second region separating unit 4' separates the logical line into character regions and blank regions. The encoding unit 5' performs an encoding (compressing) process. These above processes will be described below with reference to with FIG. 13 and the steps B1 to B17 shown in FIG. 9.

Figure 7:
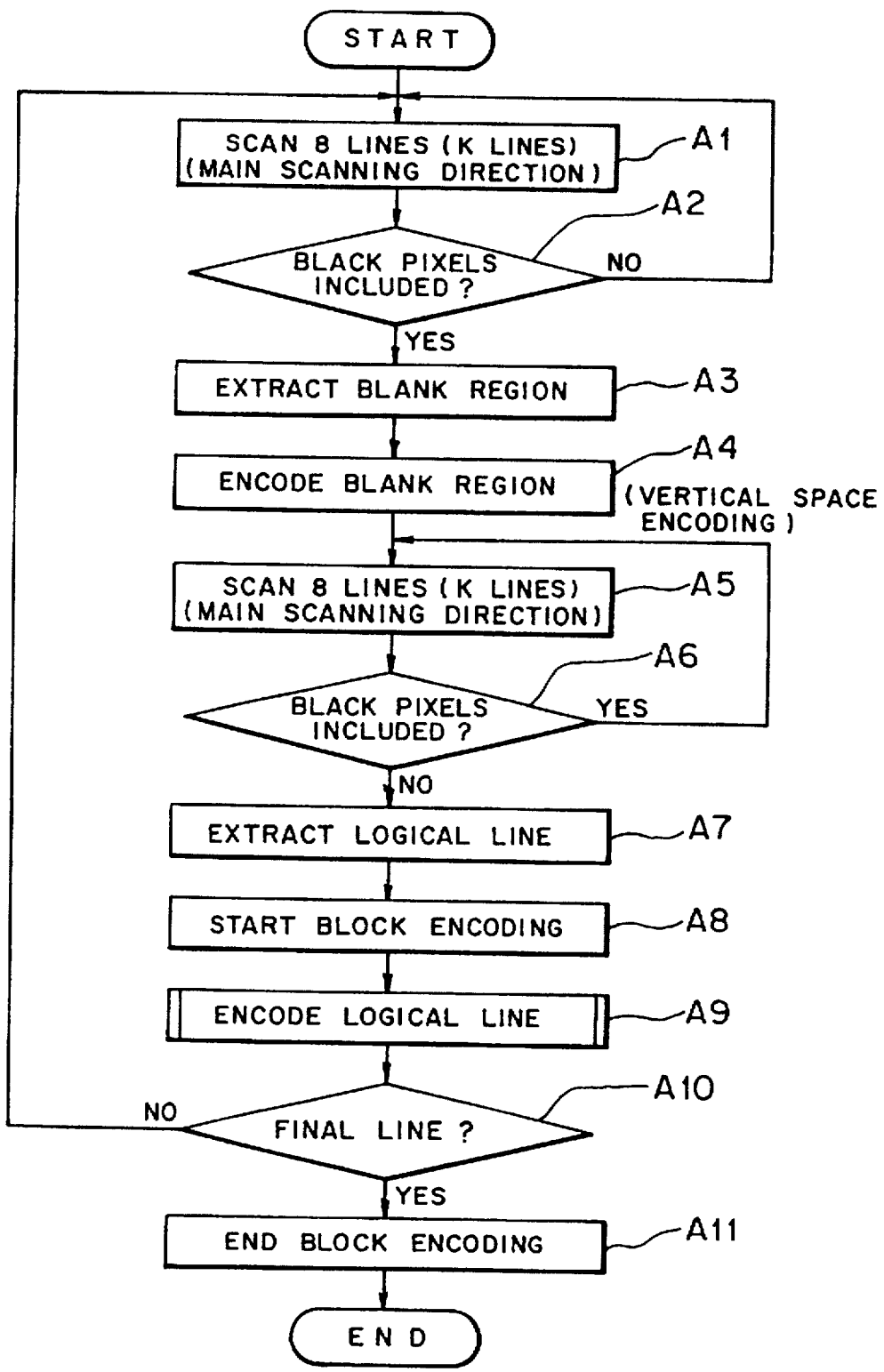
FIG. 7 is a flow chart used for explaining the operation of the first embodiment according to the present invention.
Figure 9:
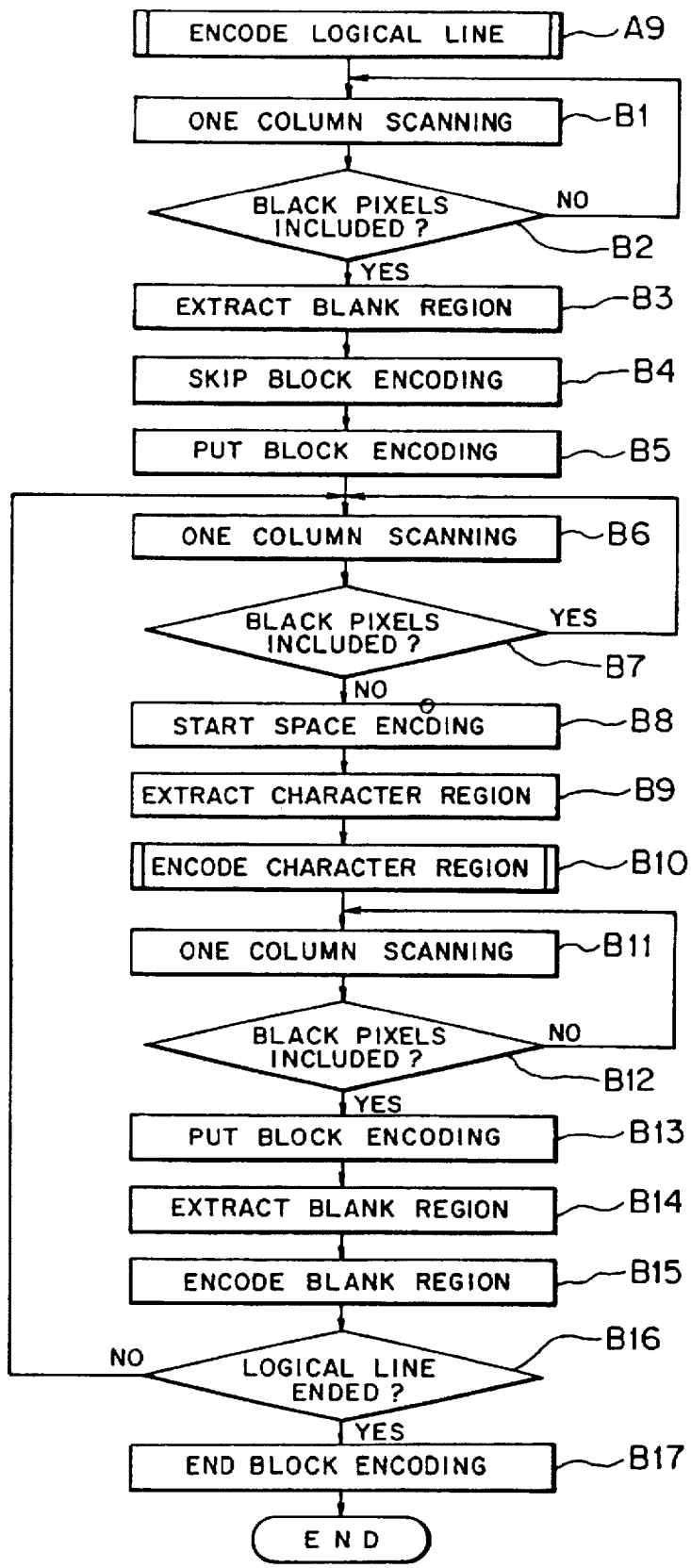
FIG. 9 is a flow chart used for explaining the operation of the first embodiment according to the present invention.

The step A9 shown in FIG. 9 succeeds from the steps A9 shown in FIG. 7. Symbol A8 shown in FIG. 13 corresponds to the process step shown in FIG. 7. Symbols B4, B5, B8, and B17 correspond to process steps shown in FIG. 9.

The secondary scanning unit 3' receives a logical line including black pixels transferred from the first region separating unit 2' (step A9), scans it in the direction perpendicular to the direction scanned by the main scanning unit 1' (toward the document in English shown in FIG. 12) every one column (byte) (step B1), and then detects whether the column includes black pixels (step B2).

The secondary scanning unit 3' transfers the detection result to the second region separating unit 4'.

Where the received logical line includes only white pixels (blanks), not black pixels, the second region separating unit 4' scans selects NO route in the step B2. Then the secondary scanning unit 3' performs again one-column scanning process.

That is, the secondary scanning unit 3' repeats one-column scanning till the logical line including characters is detected.

On the other hand, where the second region separating unit 4' receives the detection result including black pixels, YES route is selected in the step B2. The second region separating unit 4' extracts at a time the position at which white pixels appears continuously in the process, or blank regions in the logical line (corresponding to the left blank region in a document) (step B3) and then transfers it as information (H-info) to the encoding unit 5'.

The encoding unit 5' encodes the information (H-info) into a SKIP BLOCK code "110xxxxx" formed of a control classification "110" controlling so as to skip the blank region and "xxxxx" as representing the length of a black region to be skipped in four binary digits (step B4).

The encoding unit 5' also encodes the start position of a character region in a logical line into a PUT BLOCK code "101:00000" formed of a control classification "101" designating the start of a character region and "00000" representing no argument (step B5).

The secondary scanning unit 3' scans the next logical line (step B6) and then detects whether the line includes black pixels (step B7).

The secondary scanning unit 3' transfers the detection result to the second region separating unit 4'. At the reception of the detection result, if the received logical line includes black pixels, the second region separating unit 4' selects YES route in the step B7. The secondary scanning unit 3' repeats again one column scanning.

In other words, the secondary scanning unit 3' repeats one column scanning till the character region 23 ends and a new blank region starts. The case where the second region separating unit 4' receives the detection result including no black pixels (NO in the step B7) means that a new blank region (a blank between character regions) starts. The information is encoded into a START SPACE code "000:00000" formed of a control classification "000" designating the start of a space behind (end of the character region) of a character region and "00000" representing no argument (step B8).

Thus the code representing the end of a character region including continuous black pixels in a logical line, obtained by the second region separating unit 4', becomes "0" ("000:00000").

The second region separating unit 4' extracts collectively the place where black pixels appears successively in the previous process, or the character region 23 in a logical line (step B9), and then transmits as information H-info to the encoding unit 5' to encode the character region (step B10).

The secondary scanning unit 3' performs further one column scanning (step B11) and then detects whether the detection result includes black pixels (step B12).

Where the detection result includes no black pixels (NO in the step B12), the secondary scanning unit 3' performed again one column scanning. Then the secondary scanning unit 3' repeats it till the detection result includes black pixels (YES in the step B12).

Where the detection result includes black pixels (YES in the step B12), the successive region (white region between characters) ends. The fact means the start of a new character region 24. The start position of the character region is encoded into a PUT BLOCK code "101:00000" (step B13).

The second region separating unit 4' extracts the blank region (step B14) and the encoding unit 5' encodes the blank region (step B15).

Furthermore, the secondary scanning unit 3' detects whether the logical line will be completely scanned (step B16).

Where the logical line does not end, the process returns to the step B6. The steps B6 to B15 are repeated till the end of the logical line.

Where the logical line ends, the end position of the logical line is encoded into an end block (EDBLK) code designating the end of the logical line (step B17). Then the process ends.

The END BLOCK (EDBLK) code is a code "100:xxxxx" formed of a control classification "100" and an argument "xxxxx" representing a value in binary digits, the value obtained by subjecting a number counted serially from the head logical line in an already-processed document to "mod 32".

Where the number of a logical line in operation is "379", "xxxxx" is "11011" representing "27" in "379mod32=27" in binary digits.

In such a manner, a code representing information regarding a position counted from the head of a page is added immediately behind the final character region in a logical line obtained by means of the second region separating unit 4'.

In the step B5, the start position of the final character region in a logical line is encoded on each occasion. However, the start position can be encoded as a relative value to the start position of the first character region in the logical line immediately preceding the above-mentioned logical line.

In the process (steps B1 to B17), the logical line transferred from the first region separating unit 2' to the secondary scanning unit 3' is encoded into a region (character region) including black pixels and a blank region (the left end blank in a document, the space between lines, and right end blank in a document) including no black pixels.

Thus the secondary scanning unit 3' scans the logical line including character regions, transmitted from the first region separating unit 2', in the secondary direction in one byte unit, and then the second region separating unit 4' extracts the continuous blank regions as a combined blank region, thus effectively encoding (compressing) an indented left end blank and a right end blank behind a short sentence in a document.

As described above, the main scanning unit 1' scans the logical line in 8-line unit far smaller than the character size.

Hence the space between characters or English words, and the space between characters with many changes of black and white pixels in a document in Japanese can be effectively extracted and encoded, in addition to the left end blank and right end blank in a document. Naturally, the document (bit-map data) compression rate can be remarkably improved.

Moreover, in the image processing technique, normally, black pixels are represented as numeral "1" and white pixels are represented as numeral "0". The blank region just behind the character region starts essentially at a white pixel "0".

If the blank showing code is the START SPACE code of "000.00000" ("0" in decimal notation), it is unnecessary to designate the width of a character region. Furthermore, the processing load of the personal computer can be decreased and the document (bit-map data) compression rate can be largely improved.

Because a logical line representing code such as the END BLOCK (EDBLK) code is added to the end of each logical line and a logical line number counted from the processed logical line is added in the head of a document to a mod32 value, even if a bit error should occur during a data transmission, it can be prevented from propagating to the following logical lines.

In other words, even if the data compression encodes the absolute information of data to be transferred, printing data can be controlled not to be shifted downward the position where an error such as bit error has occurred.

Generally speaking, documents in English include indented modes and the beginning of the head character region occupies the same or close position in each logical line.

For that reason, the bit-map data compression rate can be further improved by encoding the beginning of the first character region in a logical line as a relative value to the first character region in the immediately precedent logical line.

Figure 10:
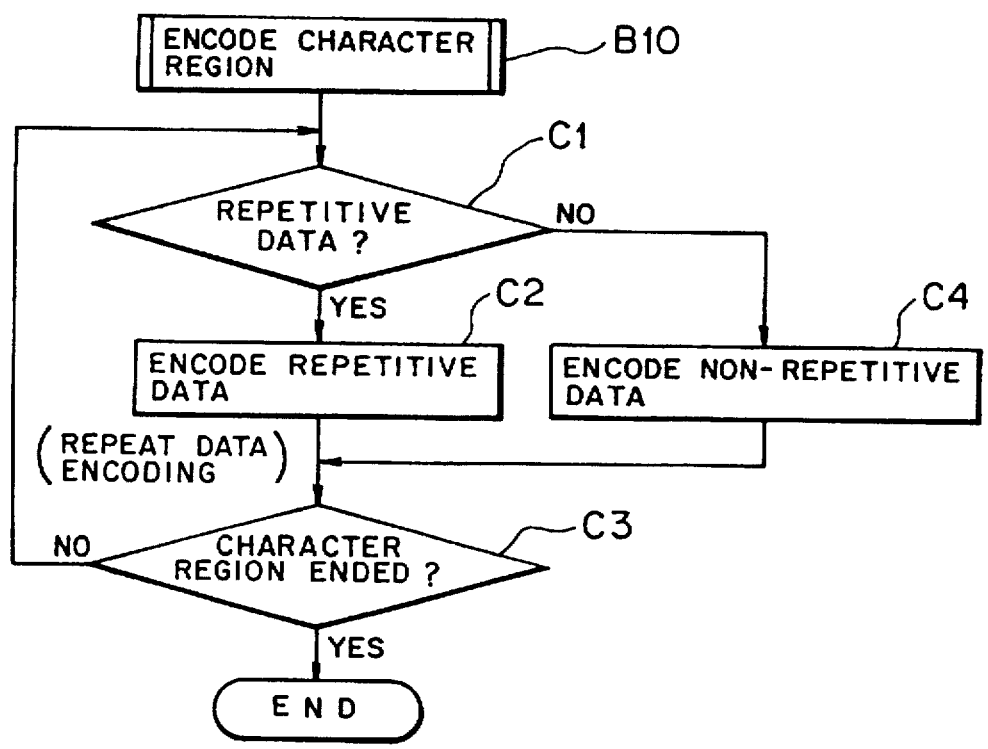
FIG. 10 is a flow chart used for explaining the operation of the first embodiment according to the present invention.

Next, explanation will be made below as to the process encoding the character region including black pixels extracted in the step B9, or the character region not encoded at the completion of the above process (steps B1 to B17), with reference to the process steps C1 to C4 shown in FIG. 10. FIG. 10 shows the step B10 following the step B10 in FIG. 9.

The encoding unit 5' receives data regarding the character region extracted in the step B9 and then detects whether the data relates to continuous data such as rules or non continuous data such as normal characters (step C1).

If the received data is continuous, YES route is selected in the step C1. The REPEAT DATA (RPTLN nm, where n is an integer of 1 or more, or a repeat number, and m is repeat data) code representing the repeat number is added to the continuous data (step C2) and is subjected to an encoding process (step C3).

Like the other code (VERTICAL SPACE code, END LINE code), in the REPEAT DATA (RPTLN n m) code "111:xxxxx", "111" represents a control classification indicating a compression of continuous data, and "xxxxx" represents an argument in binary notation indicating the appearance frequency of continuous data (repeat number) n.

Where the horizontal rule representing code of "03", for example, appears continuously as 03, 03 . . . 03, 03, 323 times, the repeat number 323 is divided into "287" and "36" to represent in binary notation every 2 byte, as explained on the VERTICAL SPACE code. Then the REPEAT NUMBER is expressed as RPTLN287 03 RPTLN36 03 (323=287+36).

The REPEAT DATA (RPTLN n m) code representing RPTLN287 is represented as "111:00000 11111111". The REPEAT DATA (RPTLN n m) code representing RPTLN36 is represented as "111:00000 00000100".

As described above, a sign formed of a control classification representing repeat and a repeat number is allocated to bit-map data continuously appearing twice or more in a character region including continuous black pixels in a logical line, obtained by the second region separating unit 4'.

If the received data is not continuous, it is encoded as it is (step C4).

Not only normal boldface such as Gothic but also continuous data such as horizontal rule can be effectively compressed by allocating a same data repeat representing code to a character region in a document.

At a completion of the process (steps A1 to A11, B1 to B17, and steps C1 to C4), the English bit-map encoding (compressing) process for a page completes as shown in FIG. 12.

FIG. 14 is a diagram illustrating the relationship between a character region and a blank region in bit-map data. FIG. 15 is a table displaying code including a VERTICAL SPACE code, a START BLOCK code, and END LINE code, functions, and arguments (options), described in the present embodiment.

In FIG. 15, regions obtained by the first region separating unit 2' and the second region separating unit 4' are identified with a 8-bit length code formed of a control classification and an argument.

For example, in the VERTICAL SPACE code, at least one 8-bit length code follows immediately behind all or 8-bit length code formed of the control classification and the argument, identifying each region.

As described above, according to the present invention, since all the blank regions in a document can be effectively extracted and encoded, the compression rate can be largely improved.

In concrete, as shown in FIG. 14, the character region ratio of a document is 6.7% on an average and the remaining occupies the blank regions including the space between characters (10.3% on an average), the intended space and the space in front of or behind a short sentence (32.5% on an average), and the space between lines (50.4% on an average).

According to the present invention, since the blank regions can be effectively extracted and encoded, the compression rate can be largely improved;

Where the bit-map data compressing process is carried out on a personal computer, a small number of control codes (8-bit length code), e.g. 8 control classifications at most, are used.

Hence, the bit-map data compression rate can be effectively improved by a simple algorithm. The burden on the compressing process can be released.

According to the present invention, the main scanning is carried out vertically in 8-bit unit (dot) in a character region. Each code (control code) is in a 8-bit length of a control classification plus an argument, or in a byte unit formed of plural 8-bit codes chained. In such a configuration, all data obtained by encoding a document (bit-map data) are in byte unit. Hence, since the compression is processed with the processing unit of a processor agreed with the bit width of a memory, processing on the side of personal computers or printers can be facilitated and improved.

(c) Explanation of the Second Embodiment of the Present Invention

Next, the second embodiment according to the present invention will be explained.

FIG. 16 is a block diagram illustrating the configuration of the bit-map data compressing device according to the second embodiment of the present invention. As shown in FIG. 16, the compressing device 9' includes a first scanning unit 1' acting as main scanning means, a first region separating unit 2' acting as first region separating means, a secondary scanning unit 3' acting as secondary scanning means, a second region separating unit 4' acting as second region separating means, a first encoding unit 5A acting as first encoding means, and a second encoding unit 5B acting as second encoding means.

The main scanning unit 1', the first region separating unit 2', the secondary scanning unit 3', and the second region separating unit 4' correspond to those in the first embodiment, respectively.

The main scanning unit 1' scans (sweeps) the document in English shown in FIG. 12 in the main scanning direction (or rightward in FIG. 12). The first region separating unit 2' separates the line scanned by the main scanning unit 1' into a region including characters (hereinafter referred to as black pixels) and a region including no characters every 8-line unit (dot).

The secondary scanning unit 3' scans a logical line defined as at least one line with characters, obtained by the first region separating unit 2', in the secondary scanning direction (downward in FIG. 12) perpendicular to the main scanning direction.

The second region separating unit 4' separates the line scanned by the secondary unit 3' into a region including characters and a region including no characters in one column unit.

The first encoding unit 5A corresponds to the encoding unit 5' used in the first embodiment and encodes a region obtained in the first region separating unit 2' and the second region separating unit 4' into an 8-bit length code XXX:xxxxx" formed of 3 bits "XXX" representing a control classification and 5 bits "xxxxx" representing an argument.

The second encoding unit 5B, not arranged in the first embodiment in FIG. 5, further encodes the first code data obtained by the first encoding unit 5A according to, for example, the adaptive Lempel-Ziv(LZ) encoding technique.

In the present embodiment, the compressing method of the bit-map data compressing device 9' corresponds to the process of the compressing device 14 shown in FIG. 6.

The case where the bit-map data compressing device compresses the document in English shown in FIG. 12, like the first embodiment, will be described below.

The main scanning unit 1' first scans the document from the top in the main scanning direction every 8-line unit (logical line) and detects whether the 8 lines includes black pixels.

The main scanning unit 1' transfers the detection result to the first region separating unit 2'. If the first region separating unit 2' receives the result including a logical line including white pixels (blanks), the main scanning unit 1' again repeats the 8-line scanning.

Where the detection result received by the first region separating unit 2' includes black pixels, the first region separating unit 2' extracts collectively the places where white pixels appears continuously, or blank regions, and then transfers them to the first encoding unit 5A.

The encoding unit 5A receives the blank region extracted in the first region separating unit 2' and then encodes it into a VERTICAL SPACE code "010:xxxxx" representing a blank region.

The VERTICAL SPACE code is the same as that described in the first embodiment. "010" represents a control classification that skips vertically on a page and "xxxxx" represents a binary number representing the run-length (the length of a continuous blank region) by which lines are vertically skipped at a document printing operation. If the run-length of the blank region is, for example, "17", the VERTICAL SPACE code becomes "010:10001".

The run-length with a decimal number of "32"or more, e.g. "200", which cannot be represented with binary 5 bits, is expressed by 2 bytes (8 bits plus 8 bits) such as a control code 010:00000 10101000, including the meaning that the argument "00000" of the 8-bit length code further includes a successive argument following the 8-bit length code and starting from the numeral "32".

In the present embodiment, the VERTICAL SPACE code can be represented with plural bytes further including plural arguments behind an argument.

Next, the main scanning unit 1' further subjects the document to the 8-line scanning and detects whether the 8 logical lines include black pixels.

The main scanning unit 1' transfers the detection result to the first region separating unit 2'. If the first region separating unit 2' receives the detection result or the received logical lines including black pixels, the main scanning unit 1' repeats the 8-line scanning to the position where all the logical lines include only white pixels.

That is, the main scanning unit 1' repeats the 8-line scanning till scanning the line 20 including characters ends and the beginning of a new blank line 21 is detected.

Thus the number of lines forming a logical line, obtained by the first region separating unit 2', is "8 (lines)".

With the detection result including no black pixels, received with the first region separating unit 2', the first region separating unit 2' extracts the location where black pixels appears continuously in the process, or the logical line including character regions, and then transfers the character regions as information V-info to the first encoding unit 5A.

Thus, the number of lines forming a logical line obtained by the first region separating unit 2' is a fixed value (N) of 8 (lines) or more.

The first encoding unit 5A encodes the received logical line into a START BLOCK code "011:00000" representing the beginning of a logical line including character regions.

The START BLOCK code "011:00000" is a 8-bit length code having the same bit format as the VERTICAL SPACE code. "011" represents a control classification and "00000" represents no argument.

In order to encode blank regions including a logical line, the first region separating unit 2' transfers the logical line to the secondary scanning unit 3' via the logical line 6 and then detects whether it is the final line (the final logical line or the bottom of a document page).

If the detection result is not the final line, the main scanning unit 1' repeats the above process till the main scanning unit 1' detects the final line.

If the detection result is the final line, the first encoding unit 5A receives the line (logical line) and then encodes it into an END LINE code "001:00000" representing the final line.

The region formed of M (e.g. "17" or "200") lines including no continuous black pixels obtained by the first region separating unit 2' are encoded as a single region. Regions including no black pixels at the head or end of a page are encoded as a single region.

Like the first embodiment, the document in English (bit-map data) is separated into a character region including black pixels in 8-line (logical line) unit and a blank region (the top in a document, the space between lines, and the bottom in a document) including black pixels. The line including characters is transferred to the secondary scanning unit 3' and the blank region is encoded in the first encoding unit 5A.

Blank regions with 8 lines or more are not extended and encoded at a time. Like the process of the first embodiment shown in FIG. 8, blank regions may be extracted and encoded in 8-line unit.

In this case, the main scanning unit 1' first scans a document from the top thereof every 8-line unit (logical line), in the main scanning direction, and detects whether the 8 lines include black pixels or not.

If the 8 lines do not include blank pixels, the first region separating unit 2' extracts blank regions for 8 lines and the first encoding unit 5A encodes the resultant into a VERTICAL SPACE code "010:xxxxx".

If the 8 lines include black pixels, the first region separating unit 2' extracts the logical line for 8 lines and the first encoding unit 5A encodes the beginning position of a logical line into a START BLOCK code "011:00000".

At the same time, in order to separate the logical line into a character region and a blank region and to encode the resultant regions, the first region separating unit 2' further transfers the logical line to the secondary scanning unit 3' via the line 6 and then detects whether the logical line is the final line (the bottom at a document page).

If the detection result is not the final line, the above-mentioned process is repeated till the final line encounters.

If the detection result is the final line, the first encoding unit 5A encodes the line into an END LINE code "001:00000" representing the bottom of a document page.

Like the first embodiment, according to the present embodiment, the main scanning unit 1' scans bit-map data in 8-line unit and the first region separating unit 2' extracts a blank region with 8 lines or more as a single blank region. Hence the blank region that is often arranged on the top or bottom of a document to provide good appearance can be effectively encoded and compressed.

The main scanning unit 1' scans in 8-dot (line) unit (the characters in the document in English in FIG. 12 being respectively 52 dots high) far smaller than the character in a document. Hence, not only the blank regions at the top and bottom but also blank regions between lines in a document can be effectively encoded and compressed.

In the present embodiment, the main scanning unit 1' scans a document in 8-line unit, but may scan it in K (an integer of 1 or more) line unit.

Like the first embodiment, the secondary scanning unit 3' scans the logical line including a character region transferred from the first region separating unit 2'; the second region separating unit 4' separates the logical line into a character region and a blank region; and the first encoding unit 5A encodes (compresses) them. Next, such a process will be described below.

The secondary scanning unit 3' receives a logical line including black pixels transferred from the first region separating unit 2' and then performs one column (byte) scanning in the direction (downward on the document in English in FIG. 12) perpendicular to the scanning direction of the main scanning unit 1' to detect whether the column includes black pixels.

The secondary scanning unit 3' transfers the detection result to the second region separating unit 4'.

Where one column data scanned includes only white pixels (blanks), the second region separating unit 4' repeats one column scanning operation till the logical line includes characters.

Where the second region separating unit 4' receives the detection result including black pixels, it extracts at a time the locations where white pixels appear continuously, or blank regions in the logical line (the left end blank region in a document), and then transmits the resultant as information into to the first encoding unit 5A.

The first encoding unit 5A encodes the resultant information into a SKIP BLOCK code "110:xxxxx" formed of a control classification "110" controlling to skip the blank region and "xxxxx" in binary notation representing the length of a blank region to be skipped.

Moreover, the beginning of a character region in a logical line is encoded into a PUT BLOCK code formed of a control classification "101" designating the beginning a character region and "00000" representing no arguments.

The secondary scanning unit 3' further subjects the logical line to one column scanning and then detects whether the column includes black pixels.

If the logical line includes black pixels, the secondary scanning unit 3' repeats one column scanning till the end of a character region is detected.

The detection result including no black pixels received in the second region separating unit 4' shows the start of a new blank region (blank between characters). Hence, the detection result is encoded into a START SPACE code "000:00000" formed of a control classification "000" indicating the start of a space behind a character region (or the end of a character region) and "00000" representing no arguments.

Thus, the sign representing the end of a character region with continuous black pixels in a logical line, obtained in the second region separating unit 4', becomes 0 ("000:00000").

The second region separating unit 4' extracts collectively the locations where black pixels appear continuously in the process, or the character region in a logical line, and then transfers the resultant as information H-info to the first encoding unit 5A to encode the character region.

The secondary scanning unit 3' further performs one column scanning and the scans whether black pixels are included.

Where the detection result includes no black pixels, the secondary scanning unit 3' repeats one column scanning till the detection result includes black pixels.

The detection result including black pixels indicates the end of the continuous region (the blank region between characters) or the start of a new character region. Thus the start position of the character region is encoded into a PUT BLOCK code "101:0000".

The second region separating unit 3' extracts the blank region. Then the first encoding unit 5A encodes the blank region.

The secondary scanning unit 3' detects whether the logical line scanned ends.

If the logical line does not end, the process is repeated till the logical line ends.

If the logical line ends, the end position of the logical line is encoded into an END BLOCK (EDBLK) code to end the process.

The END BLOCK (EDBLK) code corresponds to that in the first embodiment.

The END BLOCK code is "100:xxxxx" formed of a control classification "100" and an argument "xxxxx" in binary notation representing a value obtained by subjecting the number counted from the logical line at the head of a document already processed to mod32. Where the logical line number in a processing operation, for example, is 379, "xxxxx" is "11011" in binary notation representing 27 in 379mod32=27.

A code showing positional information counted from the page head is added immediately behind the last character region in a logical line, obtained in the second region separating unit 4'.

In the present embodiment, the start position of the first character region in a logical line may be encoded as a relative position to the first character region in the logical line immediately preceding the above-mentioned logical line.

The logical line transferred from the first region separating unit 2' to the secondary scanning unit 3' is further separated into a region (character region) including black pixels and a blank region (the left end blank, the space between lines, and the right end blank in a document) including no black pixels.

As described above, the secondary scanning unit 3' further scans the logical line including character regions transferred from the first region separating unit 2 in one byte unit in the secondary scanning direction. The second region separating unit 4' extracts continuous blank regions as one blank region. Hence, the left blank due to an indent operation and the right blank due to a short sentence can be effectively encoded (compressed).

As described above, since the main scanning unit 1' scans the logical line in 8-line unit far smaller than the character, not only the left or right blank but also the blank between characters or English words in a document can be extracted and encoded. Hence the compression rate of a document (bit-map data) can be improved largely.

Furthermore, in the image processing technique used in the first embodiment, normally, the digit "1" represents a black pixel and the digit "0" represents a white pixel. The blank region immediately behind the character region starts at a white pixel "0" without exception.

If the blank showing code is "0:00000" ("0" in decimal number) such as the START SPACE code, it is unnecessary to manifest the width of a character region. Thus the burden in processing on the computer can be reduced. The document (bit-map data) compression rate can be largely improved.

Even if an error such as a bit error occurs, an error propagation to the following logical lines can be prevented by adding a value such as the END BLOCK (EDBLK) code obtained by subjecting the code showing the last logical line in a document and a logical line number counted from the logical line already processed at the head of a document, to mod32.

Even if the absolute position information of data to be transferred has been encoded, the data compression can prevent print data from being shifted on positions following the portion where an error such as a bit error has occurred.

Generally speaking, many documents in English include indented formats. The beginnings of the head character regions in logical lines start at the same position or nearly at the same position. The compression rate can be largely improved by representing a relative value between the start position of the first character region of the logical line and the first logical line in the logical line immediately preceding the above-mentioned logical line.

Next, description will be made below as to a process that encodes character regions not encoded at the completion time of the above process.

Like the first embodiment, the first encoding unit 5A first receives data of a character region and then detects whether the data is continuous data such as rules or non continuous data such as normal characters.

If the data received is continuous, it is encoded into a REPEAT DATA (RPTLD n m, where n is an integer of 1 or more representing a repeat frequency, and m is repeat data) code.

Like the first embodiment, in the REPEAT DATA (RPTLN n m) code "111:xxxxx"."111" is a control classification designating a compression of continuous data and "xxxxx" is an argument in binary number representing the appearance frequency (repeat number) n of the continuous data.

The horizontal rule showing code "03" appears repeatedly, for example, 323 times, as 03, 03 ... 03, 03. As described on the VERTICAL SPACE code, the repeat times 323 is divided into 287 and 36 to represent as 2 byte expression, or RPTMN287 03 RPTLN36 03 (323=287+36).

The REPEAT DATA (RPTLN n m) code representing RPTLN287 is "111:0000000 11111111" and the REPEAT DATA (RPTLN n m) code representing RPTLN36 is "111:00000 00000100".

In such a manner, the repeat showing sign formed of a control classification and repeat times is allocated to data that appears continuously twice or more among bit-map data sets in a character region including continuous black pixels in a logical line obtained by the second region separating unit 4'.

If the received data is not continuous, non-continuous data received is encoded as it is.

Allocating a code showing the repetitiveness of the same data to the character region in a document can effectively improve the compression rate of continuous data such as horizontal rules, in addition to bold type such as normal Gothic.

Like the first embodiment, the code such as the VERTICAL SPACE code shown in FIG. 15 identifies the region obtained by the first region separating unit 2' and the second region separating unit 4' with a 8-bit length code. The 8-bit length code is formed of a control classification and an argument.

At least one of 8-bit length code, for example, as the VERTICAL SPACE code follows immediately behind all or 8-bit length code formed of the control classification and argument and for identifying a region.

As described above, the above-described process corresponds to the process according to the first embodiment. In the present embodiment, all blank regions in a document can be extracted and encoded effectively. 8 bits arranged vertically in a character region is handled as a unit. Each code (control code) is formed in a 8 bit length having a control classification and an argument or a byte unit having 8-bit codes chained. Hence, all data obtained by subjecting a document (bit-map data) to an encoding operation are formed in a byte unit so that the compressing process can be performed with the processor processing unit matched with the memory bit width. The operability of the personal computer and printer can be largely improved.

In such a manner, where the first encoding unit 5A encodes completely bit-map data for a page, the compressed bit-map data is formed of repetitive data sets in byte unit, including the VERTICAL SPACE code, START BLOCK code, END LINE code, SKIP BLOCK code, START SPACE code, END BLOCK code, and the like.

In the present embodiment, the second encoding unit 5B further encodes data using the adaptive Lempel-Ziv(LZ) encoding method.

The adaptive Lempel-Ziv(LZ) encoding method can effectively compress data patterns including data sets repeatedly appearing in byte unit.

Since the second encoding unit 5B further compresses the first encoded data (including VERTICAL SPACE code, START BLOCK code, END LINE code, or the like) obtained in the first encoding unit 5A, using the adaptive Lempel-Ziv(LZ) encoding method, the average bit-map data compression rate becomes 1/48.3.

On the contrary, the average bit-map data compression rate obtained by the first encoding unit 5A is 1/11.3 and the average bit-map data compression rate obtained by the second encoding unit 5B is 1/16.7. It is understood that the combination of the first and second encoding units 5A and 5B in the encoding process improves the average bit-map data compression rate 3 to 4 times.

Other encoding method (such as Huffman or universal encoding method) can be utilized instead of the encoding method of the second encoding unit 5B.

(d) Others:

As to the relationship between the numbers K, M, and N of logical lines obtained in the first region separating unit 2' seen in the first and second embodiments, the scanning in each embodiment is performed upon the condition that the number K of logical lines is 8. Hence at least one of logical lines scanned includes 8 lines or more with black pixels. The number M of lines in a region (blank region) with no continuous black pixels is over 8. These relationships are represented as $K \leq N$ or $K \leq M$.

What is claimed is:

1. A bit-map data compressing method, comprising:

a main scanning step for scanning bit-map data in a main scanning direction by performing a pixel by pixel analysis of said bit-map data, with the exception of a last pixel analyzed in a line extending in the main scanning direction, each subsequent pixel analyzed being in the main scanning direction with respect to the previously analyzed pixel;

a first region separating step for separating a region including black pixels and a region including no black pixels every K lines which extend in the main scanning direction, where K is an integer having a value of at least 1, by performing said main scanning step;

a secondary scanning step for scanning a logical line in a secondary direction perpendicular to the main scanning direction by performing a pixel by pixel analysis of said bit-map data, with the exception of a last pixel analyzed in a line extending in the main scanning direction, each subsequent pixel analyzed being in the secondary scanning direction with respect to the previously analyzed pixel, said logical line being composed of N lines extending in the main scanning direction including black pixels, where N is an integer having a value of at least 1;

a second region separating step for separating a region including black pixels in column units and a region including no black pixels, by performing said secondary scanning step; and an encoding step for encoding as an element each of regions obtained by said first region separating step and said second region separating step.

2. The bit-map data compressing method according to claim 1, further comprising the step of:

encoding a region formed of successive M lines (M≡K) as one region, said region including no black pixels obtained by the first region separating step by determining a number of consecutive groups of K lines which extend in the main scanning direction which include no black pixels.

3. The bit-map data compressing method according to claim 2, further comprising the step of:

encoding as one region a region including no black pixels in the lead of each page, obtained by said first region separating step.

4. The bit-map data compressing method according to claim 2, further comprising the step of:

encoding as one region a region including no black pixels in the end of each page, obtained by said first region separating step.

5. The bit-map data compressing method according to claim 1, further comprising the step of:

encoding as one region a region including no black pixels in said logical line, obtained by said second region separating step.

6. The bit-map data compressing method according to claim 5, further comprising the step of:

encoding as one region a region including no black pixels at the left end of each logical line, obtained by said second region separating step.

7. The bit-map data compressing method according to claim 5, further comprising the step of:

encoding as one region a region including no black pixels at the right end of each logical line, obtained by said second region separating step.

8. The bit-map data compressing method according to claim 1, wherein the number N of lines forming said logical line obtained by said first region separating step is a fixed value.

9. The bit-map data compressing method according to claim 8, wherein the number N of lines forming said logical line obtained by said first region separating step is "8".

10. The bit-map data compressing method according to claim 1, wherein the code representing the end of a character region is "0", the code being defined as a region including black pixels of the logical line obtained in said second region separating step.

11. The bit-map data compressing method according to claim 1, wherein each region obtained in said first region separating step and said second separating step is identified with a 8-bit length code.

12. The bit-map data compressing method according to claim 11, wherein the 8-bit length code identifying each region is formed of a control classification and an argument.

13. The bit-map data compressing method according to claim 12, wherein at least one of 8-bit arguments accompanies immediately behind all or part of 8-bit length code identifying regions each formed of a control classification and an argument.

14. The bit-map data compressing method according to claim 1, further comprising the step of:

allocating a code representing repetition to data appearing continuously twice or more in bit-map data included in a character region including black pixels in said logical line obtained in said second region separating step, said code formed of a control classification and the number of repetitive cycles.

15. The bit-map data compressing method according to claim 1, further comprising the step of:
adding a code representing information regarding a position counted from the head of a page, immediately after the final character region in the logical line obtained in said second region separating step.

16. The bit-map data compressing method according to claim 1, further comprising the step of:
encoding as a relative value the start position of the first character region in a logical line to the start position of the first character region of the logical line immediately in front of said logical line.

17. A bit-map data compressing method, comprising:
a main scanning step for scanning bit-map data in a main scanning direction by performing a pixel by pixel analysis of said bit-map data, with the exception of a last pixel analyzed in a line extending in the main scanning direction, each subsequent pixel analyzed being in the main scanning direction with respect to the previously analyzed pixel;
a first region separating step for separating a region including black pixels and a region including no black pixels every K lines which extend in the main scanning direction where K is an integer having a value of at least 1, by performing said main scanning step;
a secondary scanning step for scanning a logical line in a secondary direction perpendicular to the main scanning direction by performing a pixel by pixel analysis of said bit-map data, with the exception of a last pixel analyzed in a line extending in the main scanning direction, each subsequent pixel analyzed being in the secondary scanning direction with respect to the previously analyzed pixel, said logical line being composed of N lines extending in the main scanning direction including black pixels, where N is an integer having a value of at least 1;
a second region separating step for separating a region including black pixels in column units and a region including no black pixels, by performing said secondary scanning step;
a first encoding step for encoding as an element each region obtained in said first region separating step and said second region separating step; and
a second encoding step for subjecting said first encoded data to a second encoding process, said first encoded data obtained by encoding regions as elements respectively obtained in said first region separating step and said second region separating step, in said first encoding step.

18. The bit-map data compressing method according to claim 17, further comprising the step of:
encoding a region formed of successive M lines (M≡K) as one region, said region including no black pixels obtained by the first region separating step by determining a number of consecutive groups of K lines which extend in the main scanning direction which include no black pixels.

19. The bit-map data compressing method according to claim 18, further comprising the step of:
encoding as one region a region including no black pixels in the lead of each page, obtained by said first region separating step.

20. The bit-map data compressing method according to claim 18, further comprising the step of:
encoding as one region a region including no black pixels in the end of each page, obtained by said first region separating step.

21. The bit-map data compressing method according to claim 17, further comprising the step of:
encoding as one region a region including no black pixels in said logical line, obtained by said second region separating step.

22. The bit-map data compressing method according to claim 21, further comprising the step of:
encoding as one region a region including no black pixels at the left end of each logical line, obtained by said second region separating step.

23. The bit-map data compressing method according to claim 21, further comprising the step of:
encoding as one region a region including no black pixels at the right end of each logical line, obtained by said second region separating step.

24. The bit-map data compressing method according to claim 17, wherein the number of N lines forming said logical line obtained by said first region separating step is a fixed value.

25. The bit-map data compressing method according to claim 24, wherein the number of N lines forming said logical line obtained by said first region separating step is "8".

26. The bit-map data compressing method according to claim 17, wherein the code representing the end of a character region is "0", the code being defined as a region including black pixels of the logical line obtained in said second region separating step.

27. The bit-map data compressing method according to claim 17, wherein each region obtained in said first region separating step and said second separating step is identified with a 8-bit length code.

28. The bit-map data compressing method according to claim 27, wherein the 8-bit length code identifying each region is formed of a control classification and an argument.

29. The bit-map data compressing method according to claim 28, wherein at least one of 8-bit arguments accompanies immediately behind all or part of 8-bit length code identifying regions each formed of a control classification and an argument.

30. The bit-map data compressing method according to claim 17, further comprising the step of:
allocating a sign representing repetition to data appearing continuously a twice or more in bit-map data included in a character region including black pixels in said logical line obtained in said second region separating step, said code being formed of a control classification and the number of repetitive cycles.

31. The bit-map data compressing method according to claim 17, further comprising the step of:
adding a code representing information regarding a position counted from the head of a page, immediately after the final character region in the logical line obtained in said second region separating step.

32. The bit-map data compressing method according to claim 17, further comprising the step of:
encoding as a relative value the start position of the first character region in a logical line to the start position of the first character region of the logical line immediately in front of said logical line.

33. A bit-map data compressing device, comprising:
main scanning means for scanning bit-map data in a main scanning direction by performing a pixel by pixel analysis of said bit-map data, with the exception of a last pixel analyzed in a line extending in the main scanning direction, each subsequent pixel analyzed being in the main scanning direction with respect to the previously analyzed pixel;

first region separating means for separating a region including black pixels and a region including no black pixels every K lines which extend in the main scanning direction where K is an integer having a value of at least 1, based on data obtained by operating said main scanning means;

secondary scanning means for scanning a logical line in a secondary direction perpendicular to the main scanning direction by performing a pixel by pixel analysis of said bit-map data, with the exception of a last pixel analyzed in a line extending in the secondary scanning direction, each subsequent pixel analyzed being in the secondary scanning direction with respect to the previously analyzed pixel, said logical line being composed of N lines extending in the main scanning direction including black pixels, N being an integer having a value of at least 1;

second region separating means for separating a region including black pixels in column units and a region including no black pixels, based on data obtained by operating said secondary scanning means; and encoding means for encoding each region obtained by said first region separating means and said second region separating means into a code formed of a control classification and an argument.

34. A bit-map data compressing device, comprising:

main scanning means for scanning bit-map data in a main scanning direction by performing a pixel by pixel analysis of said bit-map data, with the exception of a last pixel analyzed in a line extending in the main scanning direction, each subsequent pixel analyzed being in the main scanning direction with respect to the previously analyzed pixel;

first region separating means for separating a region including black pixels and a region including no black pixels every K lines which extend in the main scanning direction where K is an integer having a value of at least 1, based on data obtained by operating said main scanning means;

secondary scanning means for scanning a logical line in a secondary direction perpendicular to the main scanning direction by performing a pixel by pixel analysis of said bit-map data, with the exception of a last pixel analyzed in a line extending in the secondary scanning direction, each subsequent pixel analyzed being in the secondary scanning direction with respect to the previously analyzed pixel, said logical line being composed of N lines extending in the main scanning direction including black pixels, where N is an integer having a value of at least 1;

second region separating means for separating a region including black pixels in column unit and a region including no black pixels, based on data obtained by operating said secondary scanning means;

first encoding means for encoding each region obtained by said first region separating means and said second region separating means into a code formed of a control classification and an argument; and second encoding means for encoding the first encoded data obtained by said first encoding means into code data with a variable length.

* * * * *